US010067252B2

(12) United States Patent
Madof

(10) Patent No.: US 10,067,252 B2
(45) Date of Patent: Sep. 4, 2018

(54) METHODS AND SYSTEMS FOR IDENTIFYING A CLATHRATE DEPOSIT

(71) Applicant: Chevron U.S.A. Inc., San Ramon, CA (US)

(72) Inventor: Andrew Stuart Madof, Bellaire, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 212 days.

(21) Appl. No.: 15/218,910

(22) Filed: Jul. 25, 2016

(65) Prior Publication Data
US 2018/0024261 A1    Jan. 25, 2018

(51) Int. Cl.
| | |
|---|---|
| *E21B 41/00* | (2006.01) |
| *G01V 1/30* | (2006.01) |
| *G06T 5/20* | (2006.01) |
| *G06T 11/60* | (2006.01) |
| *G01V 1/36* | (2006.01) |
| *E21B 43/00* | (2006.01) |

(52) U.S. Cl.
CPC ............ *G01V 1/30* (2013.01); *E21B 41/0092* (2013.01); *E21B 43/00* (2013.01); *G01V 1/364* (2013.01); *G06T 5/20* (2013.01); *G06T 11/60* (2013.01); *G06T 2207/30181* (2013.01)

(58) Field of Classification Search
CPC ....... E21B 41/0092; E21B 43/00; G01V 1/30; G01V 1/364; G06T 5/20; G06T 11/60; G06T 2207/30181
See application file for complete search history.

(56) References Cited

U.S. PATENT DOCUMENTS

| | | |
|---|---|---|
| 4,679,174 A | 7/1987 | Gelfand |
| 4,969,130 A | 11/1990 | Wason et al. |
| 4,972,383 A | 11/1990 | Lailly |
| 5,083,297 A | 1/1992 | Ostrander |
| 5,513,150 A | 4/1996 | Sicking et al. |
| 5,587,968 A | 12/1996 | Barr |

(Continued)

OTHER PUBLICATIONS

"Applying Filters with montaj Geophysics"; GEOSOFT Oasis montaj, Geophysics How-To Guide Publication Date: Jan. 16, 2013, pp. 1-13.

(Continued)

*Primary Examiner* — Yong-Suk Ro

(57) ABSTRACT

A method includes using a computing system in generating a land surface or sea floor digital image from post-stack seismic data and determining a clathrate stability zone from the land surface or sea floor digital image. The method also includes generating a laterally extensive subsurface digital image from the seismic data that is within or below the clathrate stability zone and filtering the laterally extensive subsurface digital image to generate a pull-up digital image. The method also includes generating a coarse-grained sediment digital image from the seismic data within the clathrate stability zone. The method also includes spatially superimposing the coarse-grained sediment digital image and the pull-up digital image to generate a combined digital image. The method also includes determining an overlap region from the combined digital image. The overlap region is indicative of a clathrate deposit.

23 Claims, 22 Drawing Sheets

(56) References Cited

U.S. PATENT DOCUMENTS

| | | | |
|---|---|---|---|
| 5,629,904 | A | 5/1997 | Kosloff et al. |
| 5,706,194 | A | 1/1998 | Neff et al. |
| 5,798,982 | A | 8/1998 | He et al. |
| 5,835,882 | A | 11/1998 | Vienot et al. |
| 5,835,883 | A | 11/1998 | Neff et al. |
| 5,870,691 | A | 2/1999 | Partyka et al. |
| 6,012,018 | A | 1/2000 | Hornbuckle |
| 6,151,556 | A | 11/2000 | Allen |
| 6,289,285 | B1 | 11/2001 | Neff et al. |
| 7,230,879 | B2 | 6/2007 | Herkenhoff et al. |
| 7,388,808 | B2 | 6/2008 | Lee et al. |
| 7,493,241 | B2 | 2/2009 | Lee et al. |
| 7,537,058 | B2 | 5/2009 | Gullapalli et al. |
| 7,672,824 | B2 | 3/2010 | Dutta et al. |
| 7,675,818 | B2 | 3/2010 | Liu et al. |
| 7,812,203 | B2 | 10/2010 | Balczewski |
| 7,912,649 | B2 | 3/2011 | Harris et al. |
| 7,964,150 | B2 | 6/2011 | Balczewski |
| 7,983,846 | B2 | 7/2011 | Sun et al. |
| 8,027,790 | B2 | 9/2011 | Burtz et al. |
| 8,090,555 | B2 | 1/2012 | Dai et al. |
| 8,185,313 | B2 | 5/2012 | Houck |
| 8,185,314 | B2 | 5/2012 | Murray et al. |
| 8,201,626 | B2 | 6/2012 | Balczewski |
| 8,203,907 | B2 | 6/2012 | Krebs et al. |
| 8,232,428 | B2 | 7/2012 | Mousa et al. |
| 8,265,915 | B2 | 11/2012 | Hsu et al. |
| 8,423,337 | B2 | 4/2013 | Hsu et al. |
| 8,537,637 | B2 | 9/2013 | Laake |
| 8,548,782 | B2 | 10/2013 | Hsu et al. |
| 8,614,578 | B2 | 12/2013 | Gao et al. |
| 8,768,672 | B2 | 7/2014 | Hsu et al. |
| 8,923,094 | B2 | 12/2014 | Jing et al. |
| 9,085,957 | B2 | 7/2015 | Wallace et al. |
| 2002/0055820 | A1 | 5/2002 | Scannell |
| 2002/0173917 | A1 | 11/2002 | Nickel |
| 2004/0162677 | A1 | 8/2004 | Bednar et al. |
| 2008/0102000 | A1 | 5/2008 | Balczewski |
| 2008/0162051 | A1 | 7/2008 | Ikelle |
| 2008/0319674 | A1 | 12/2008 | Dai et al. |
| 2009/0228255 | A1 | 9/2009 | Levin |
| 2010/0014384 | A1 | 1/2010 | Colombo et al. |
| 2010/0074053 | A1 | 3/2010 | Jaiswal et al. |
| 2011/0054795 | A1 | 3/2011 | Klein et al. |
| 2011/0131020 | A1 | 6/2011 | Meng |
| 2011/0267921 | A1 | 11/2011 | Mortel et al. |
| 2011/0273961 | A1 | 11/2011 | Hu |
| 2011/0292767 | A1 | 12/2011 | Dai |
| 2011/0313667 | A1 | 12/2011 | Levin |
| 2012/0113750 | A1 | 5/2012 | Al-Momin et al. |
| 2012/0243373 | A1 | 9/2012 | Shin |
| 2014/0142853 | A1* | 5/2014 | Daigle ............... G01N 15/088 702/2 |
| 2014/0153366 | A1 | 6/2014 | Nealon et al. |
| 2014/0153367 | A1 | 6/2014 | Nealon et al. |
| 2014/0254321 | A1* | 9/2014 | Woelk .................. G01V 1/306 367/73 |
| 2015/0066461 | A1* | 3/2015 | Kacewicz ............. E21B 43/00 703/10 |
| 2015/0090455 | A1 | 4/2015 | Balczewski |
| 2017/0057838 | A1* | 3/2017 | MacKinnon ............ C02F 1/24 |
| 2018/0024262 | A1* | 1/2018 | Madof ............... E21B 41/0092 |

OTHER PUBLICATIONS

"Getting Started with montaj Geophysics"; GEOSOFT Oasis montaj, Geophysics How-To Guide Publication Date: Jan. 15, 2013, pp. 1-14.

Amundsen, Lasse, et al.; "Gas Hydrates—Part V: The Resource Potential"; 2015, GEOExPro, vol. 11, No. 6, pp. 1-11.

Blias, E., et al.; "Stacking Velocities in the Presence of Shallow Anamalies, Critique, Analysis and Improvement of Understanding"; SPNA 2.7, SEG/Houston 2005 Annual Meeting, pp. 2193-2196, with edited references.

Boehm, Gualtiero, et al.; "Reflection Tomography Versus Stacking Velocity Analysis"; Journal of Applied Geophysics, 1996, vol. 35, pp. 1-13.

Boschi, L., et al.; "Multiple Resolution Surface Wave Tomography: the Mediterranean Basin"; Geophys. J. Int., 2004, vol. 157, pp. 293-304.

Bube, Kenneth P., et al.; "The Null Space of a Generally Anisotropic Medium in Linearized Surface Reflection Tomography"; Geophys. J. Int., 1999, vol. 139, pp. 9-50.

Cooper, Alan K., et al.; "High-Resolution Seismic-Reflection Investigation of the Northern Gulf of Mexico Gas-Hydrate-Stability Zone"; Marine and Petroleum Geology, 2003, vol. 19, pp. 1275-1293.

Dai, Jianchun, et al.; "Detection and Estimation of Gas Hydrates Using Rock Physics and Seismic Inversion: Examples from the Northern Deepwater Gulf of Mexico"; The Leading Edge, Jan. 2004, pp. 60-66.

Dillon, William P., et al.; "Gas Hydrate in Seafloor Sediments: Impact on Future Resources and Drilling Safety"; OTC 13034, Apr.-May 2001, pp. 1-10.

Ecker, Christine, et al.; "Estimating the Amount of Hydrate and Free Gas from Surface Seismic"; 1998 SEG Expanded Abstracts, pp. 1-4.

Ecker, Christine; "Seismic Characterization of Methane Hydrate Structures"; A Dissertation submitted to the Department of Geophysics and the Committee of Graduate Studies of Stanford University, Jun. 2001, pp. i-xxi, and pp. 1-51 (Part 1 of 2).

Ecker, Christine; "Seismic Characterization of Methane Hydrate Structures"; A Dissertation submitted to the Department of Geophysics and the Committee of Graduate Studies of Stanford University, Jun. 2001, pp. 52-123 (Part 2 of 2).

Etgen, John Theodore; "Residual Prestack Migration and Interval-Velocity Estimation"; A Dissertation submitted to the Department of Geophysics and the Committee of Graduate Studies of Stanford University, Oct. 1990, Title page, p. ii (Copyright), pp. iii-iv (Abstract), p. v (Acknowledgements), pp. vii-ix (Table of Contents), pp. xi-xiii (List of Figures).

Flecha, I, et al.; "Imaging Low-Velocity Anomalies with the Aid of Seismic Tomography"; Tectonophysics, 2004, vol. 388, pp. 225-238.

Fruehn, Juergen, et al; "Resolving Near-Seabed Velocity Anomalies: Deep Water Offshore Eastern India"; Geophysics, vol. 73, No. 5, Sep.-Oct. 2008, pp. VE235-VE241.

Gorman, Andrew R., et al.; "Migration of Methane Gas Through the Hydrate Stability Zone in a Low-Flux Hydrate Province"; Apr. 2002, Geology, vol. 30, No. 4, pp. 327-330.

Guillaume, Patrice, et al.; "3D Finite-Offset Tomography Inversion of CRP-Scan Data, With or Without Anisotropy"; $70^{st}$ SEG International Exposition & Annual Meeting, Sep. 2011, pp. 31-34.

Hornbach, Matthew J., et al.; "Direct Seismic Detection of Methane Hydrate on the Blake Ridge"; Geophysics, vol. 68, No. 1, Jan.-Feb. 2003, pp. 92-100.

Inamori, Takao, et al.; "Detection of Methane Hydrate-Bearing Zones from Seismic Data"; Resource Geology, 2004, vol. 54, No. 1, pp. 99-104.

Kim, Y.C., et al.; "Efficient Velocity Model Building for Prestack Depth Migration"; The Leading Edge, Jun. 1996, pp. 751-753.

Kumar, Dhanajay, et al.; "P-wave Seismic Anisotropy on Hydrate Ridge"; SEG Int'l Exposition and $74^{th}$ Annual Meeting, Oct. 2004, pp. 1-4.

Liu, Wei, et al.; "Mitigation of Uncertainty in Velocity and Anisotropy Estimation for Prestack Depth Imaging"; SEG Int'l Exposition and $74^{th}$ Annual Meeting, Oct. 2004, pp. 1-4.

Lomax, Anthony; "The Wavelength-Smoothing Method for Approximating Broad-Band Wave Propagation Through Complicated Velocity Structures"; Geophys., J. Int., 1994, vol. 117, pp. 313-334.

Lu, Shaoming, et al.; "Estimation of Gas Hydrate and Free Gas Saturation, Concentration, and Distribution from Seismic Data"; Geophysics, vol. 67, No. 2, Mar.-Apr. 2002, pp. 582-593.

Lu, Shaoming, et al.; "Identification of Shallow-Water-Flow Sands by $V_pIV_s$ Inversion of Conventional 3D Seismic Data"; Geophysics, vol. 70, No. 5, Sep.-Oct. 2005, pp. O29-O37.

(56) References Cited

OTHER PUBLICATIONS

Mao, Weijan, et al.; "Automated Interval Velocity Inversion"; SEG 2000 Expanded Abstracts, SEG Annual Meeting, Aug. 2000, pp. 1-4.
Moridis, G.J., et al.; "Challenges, Uncertainties, and Issues Facing Gas Production from Gas-Hydrate Deposits"; SPE Reservoir Envaluation & Engineering, Feb. 2011, pp. 76-112.
Sambridge, M.S.; "Non-Linear Arrival Time Inversion: Constraining Velocity Anomalies by Seeking Smooth Models in 3-D"; Geophys. J. Int., 1990, vol. 102, pp. 653-677.
Shelander, Dianna, et al.; "Predicting Saturation of Gas Hydrates Using Pre-Stack Seismic Data, Gulf of Mexico"; Mar. Geophys. Res., 2010, vol. 31, pp. 39-57.
Spakman, Wim; "Delay-Time Tomography of the Upper Mantle Below Europe, the Mediterranean, and Asia Minor"; Geophys. J. Int., 1991, vol. 107, pp. 309-332.
Tinivella, Umberta, et al.; "Estimation of Gas-Hydrate Concentration and Free-Gas Saturation from Log and Seismic Data"; The Leading Edge, Feb. 2001, pp. 200-203.
Wang, Xiujuan, et al.; "Elevated Gas Hydrate Saturation Within Silt and Silty Clay Sediments in the Shenhu Area, South China Sea"; 2011, Journal of Geophysical Research, vol. 116, No. B05102, pp. 1-18.
Westbrook, G.K., et al.; "Estimation of Gas Hydrate Concentration from Multi-Component Seismic Data at Sites on the Continental Margins of NW Svalbard and the Storegga Region of Norway"; Marine and Petroleum Geology, Sep. 2008, vol. 25, Issue 8, pp. 744-758.
Yordkayhun, Sawasdee, et al.; "Shallow Velocity-Depth Model Using First Arrival Traveltime Inversion at the $CO_2SINK$ Site, Ketzin, Germany"; Journal of Applied Geophysics, 2007, vol. 63, pp. 68-79.
Yuan, T., et al.; "Seismic Velocity Studies of a Gas Hydrate Bottom-Simulating Reflector on the Northern Cascadia Continental Margin: Amplitude Modeling and Full Waveform Inversion"; Journal of Geophysical Research, Jan. 1999, vol. 104, No. B1, pp. 1179-1191.
Zelt, Colin a., et al.; "Three-Dimensional Seismic Refraction Tomography: A Comparison of Two Methods Applied to Data from the Faeroe Basin"; Journal of Geophysical Research, Apr. 1998, vol. 103, No. B4, pp. 7187-7210.
International Search Report, dated Dec. 18, 2013, during the prosecution of International Application No. PCT/US2013/054625.
Written Opinion of the International Searching Authority, dated Dec. 18, 2013, during the prosecution of International Application No. PCT/US2013/054625.
International Search Report, dated Dec. 19, 2013, during the prosecution of International Application No. PCT/US2013/060052.
Written Opinion of the International Searching Authority, dated Dec. 19, 2013, during the prosecution of International Application No. PCT/US2013/060052.
International Search Report, dated Jul. 25, 2014, during the prosecution of International Application No. PCT/US2014/018572.
Written Opinion of the International Searching Authority, dated Jul. 25, 2014, during the prosecution of International Application No. PCT/US2014/018572.
Chand, S., et al.; "Seismic Constraints on the Effects of Gas Hydrate on Sediment Physical Properties and Fluid Flow: A Review"; (2003), Geofluids, vol. 3, No. 4, pp. 275-289.
Hien, Doan Huy, et al.; "Multiple Seismic Attribute Analyses for Determination of Bottom Simulating Reflector of Gas Hydrate Seismic Data in the Ulleung Basin of Korea"; (2010), Marine Geophysical Researches, vol. 31, Nos. 1-2, pp. 121-132.
Matsumoto, Ryo, et al.; "Occurrence and Exploration of Gas Hydrate in the Marginal Seas and Continental Margin of the Asia and Oceania Region"; (2011), Marine and Petroleum Geology, vol. 28, No. 10, pp. 1751-1767.
Shankar, Uma, et al.; "Assessment of Gas Hydrate Saturation in Marine Sediments from Resistivity and Compressional-Wave Velocity Log Measurements in the Mahanadi Basin, India"; (2014), Marine and Petroleum Geology, vol. 58, pp. 265-277.
Zhang, Zijian, et al.; "Quantitative Interpretation for Gas Hydrate Accumulation in the Eastern Green Canyon Area, Gulf of Mexico Using Seismic Inversion and Rock Physics Transform"; Case History, (2011), vol. 76, No. 4, pp. B139-B150.
International Search Report, dated Aug. 1, 2017, during the prosecution of International Application No. PCT/US2017/029302.
Written Opinion of the International Searching Authority, dated Aug. 1, 2017, during the prosecution of International Application No. PCT/US2017/029302.
International Search Report, dated Aug. 1, 2017, during the prosecution of International Application No. PCT/US2017/029299.
Written Opinion of the International Searching Authority, dated Aug. 1, 2017, during the prosecution of International Application No. PCT/US2017/029299.

* cited by examiner

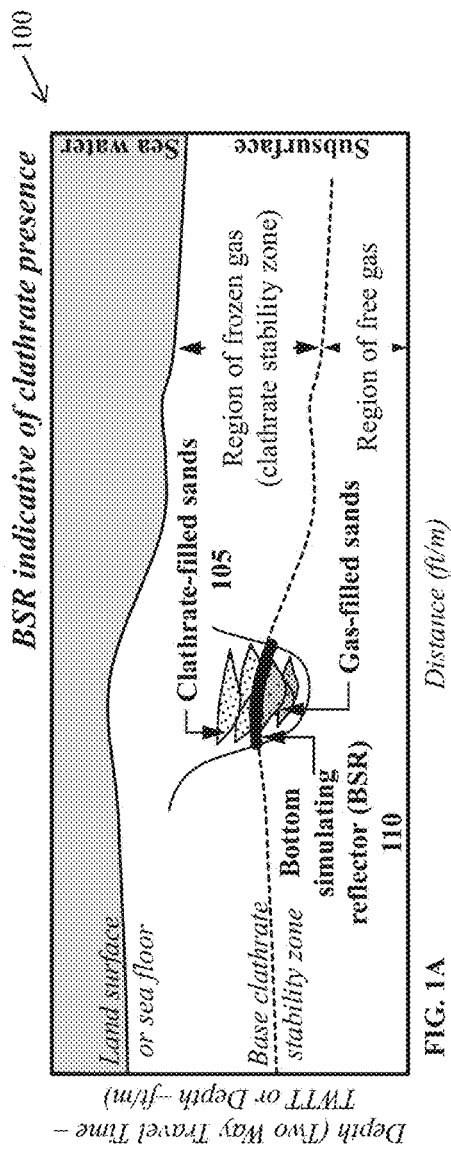
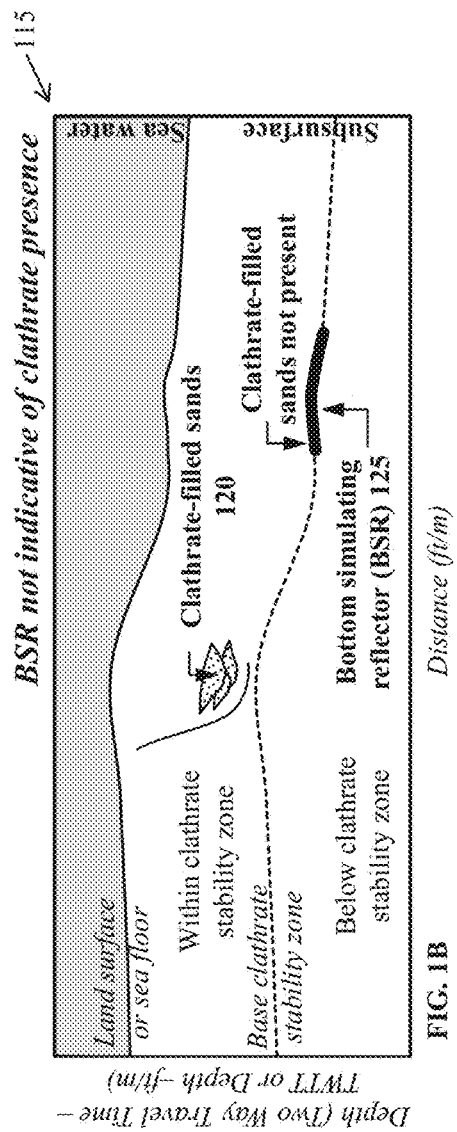
FIG. 1A
FIG. 1B

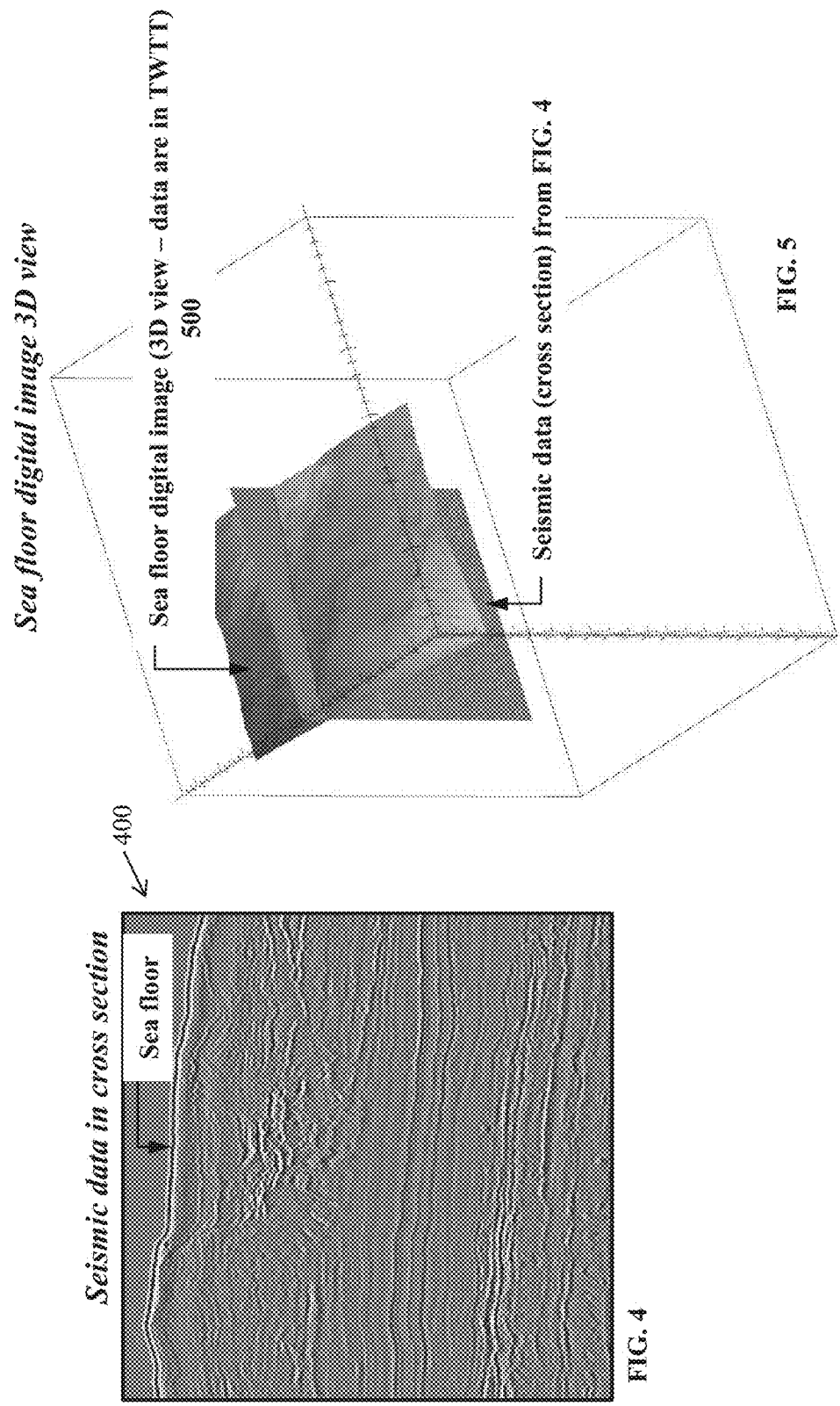

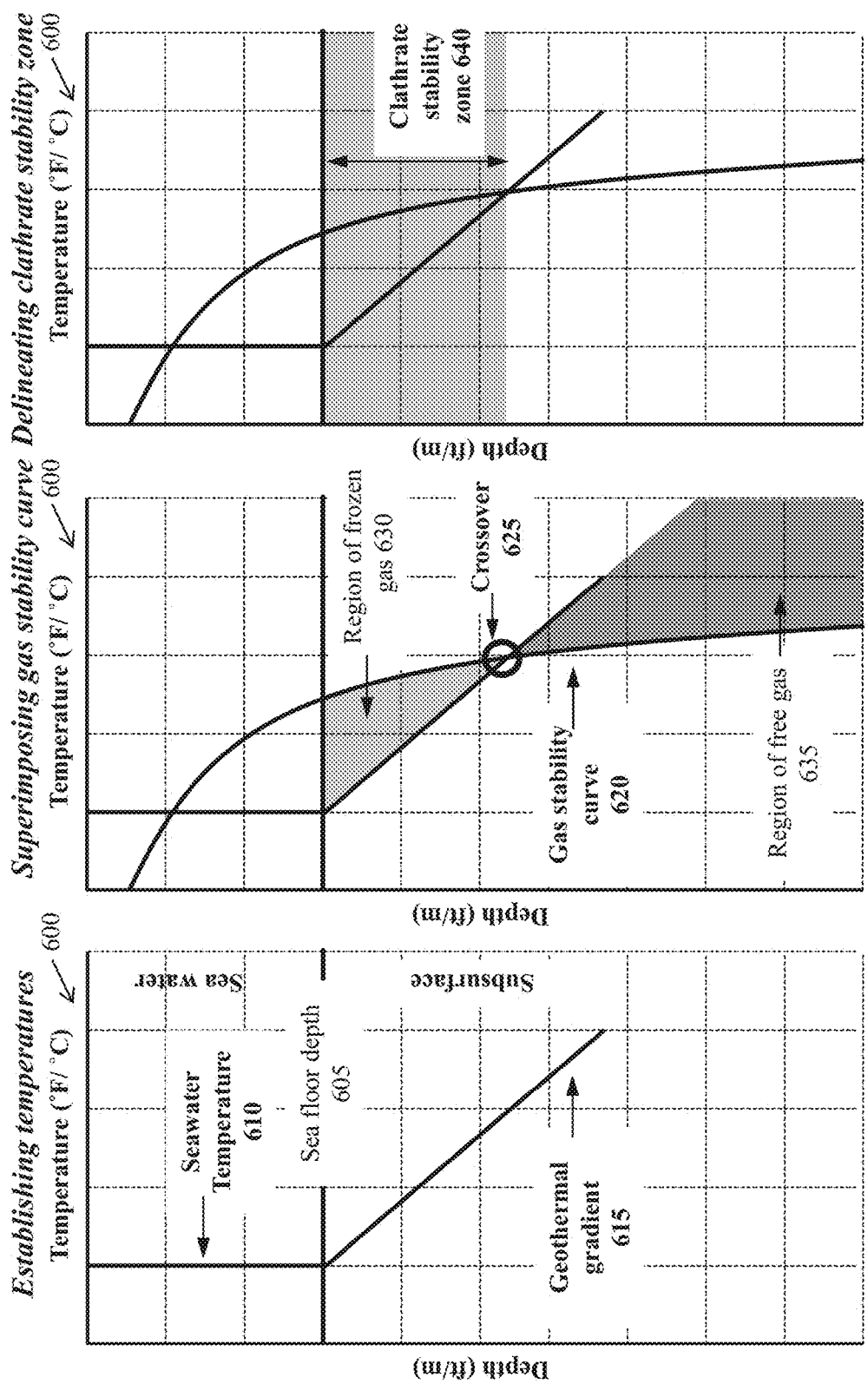

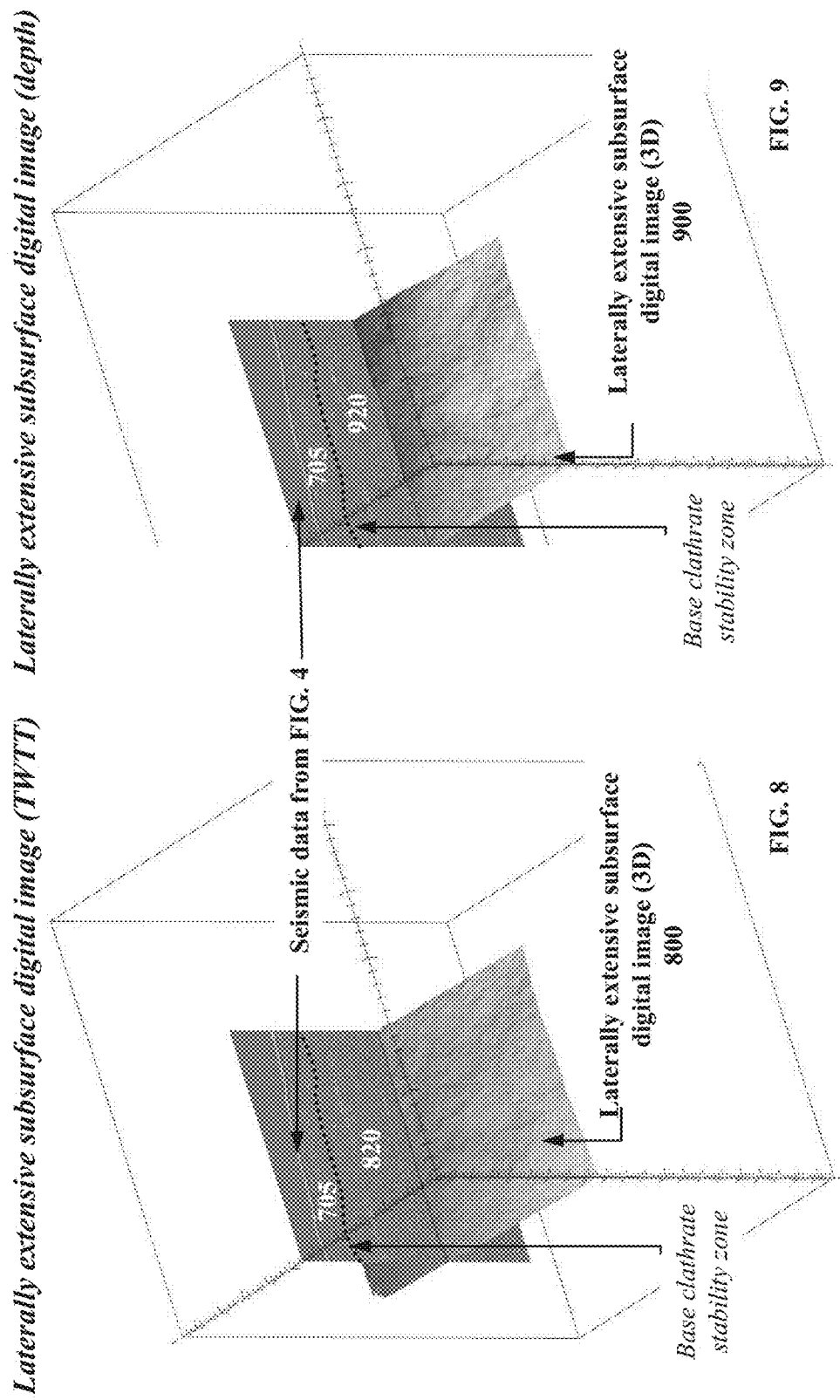

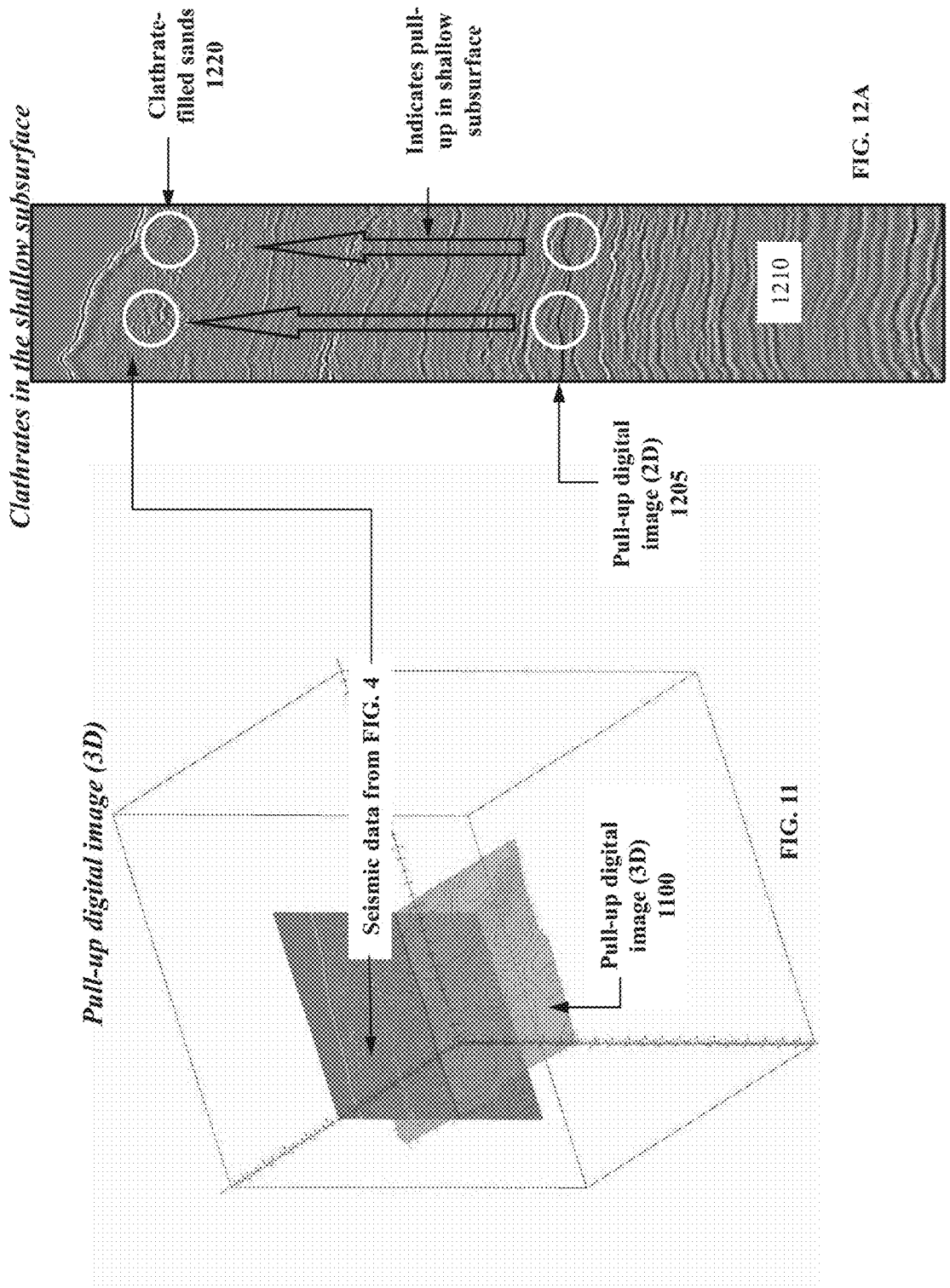

*Seismic data illustrating pull-up in the subsurface*

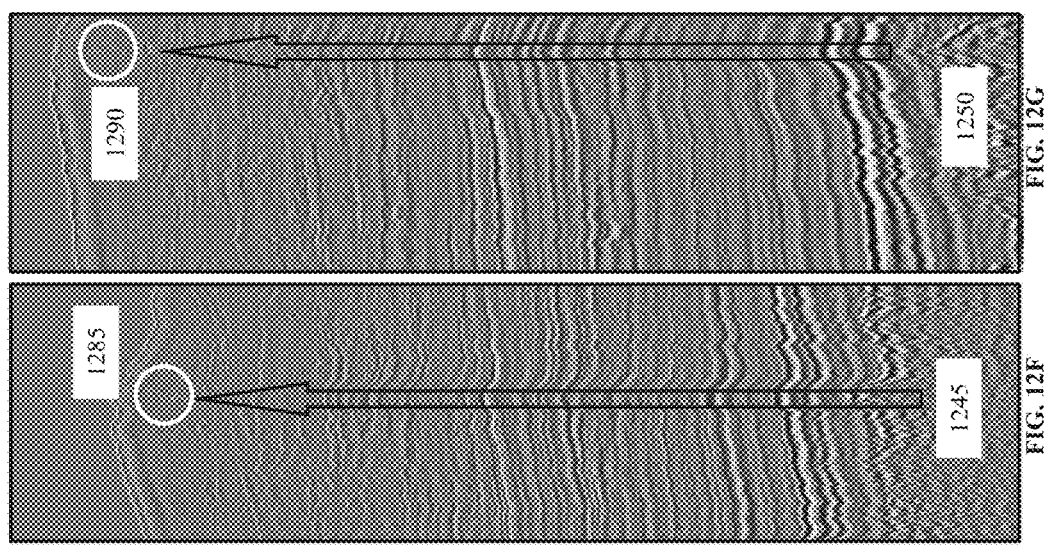

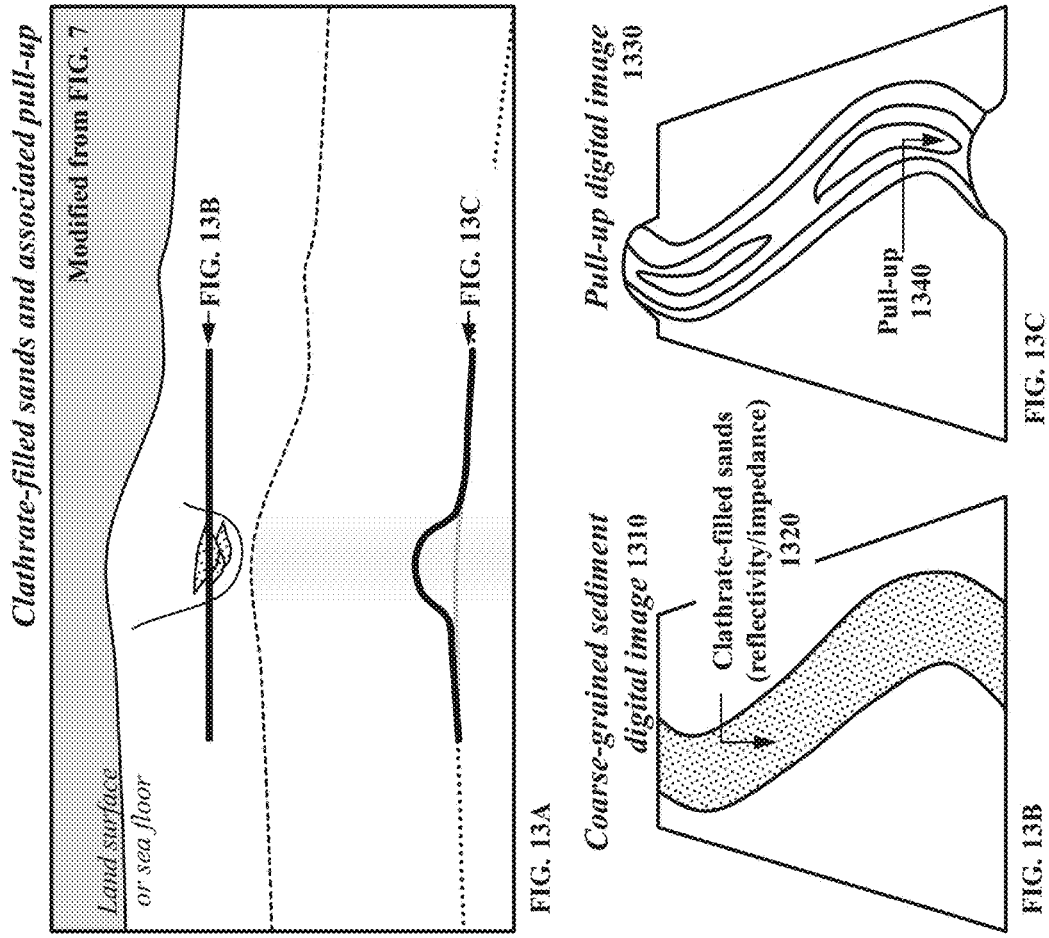

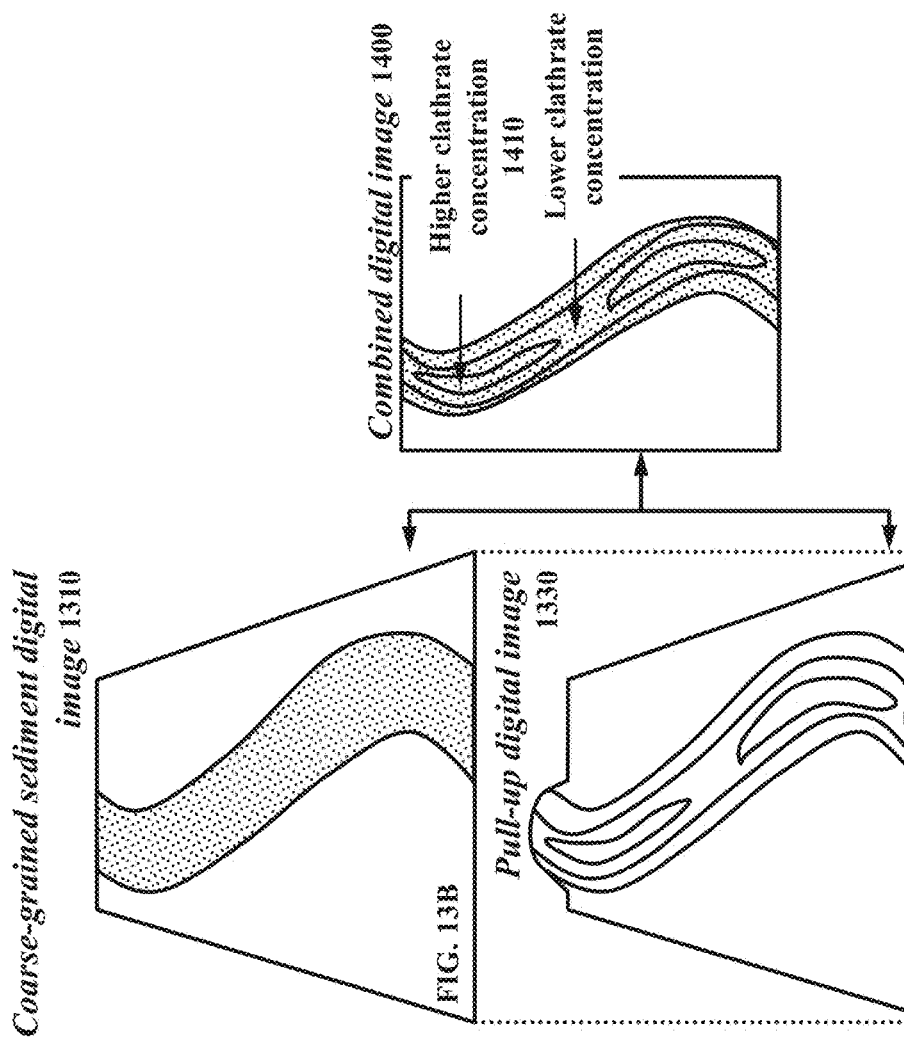

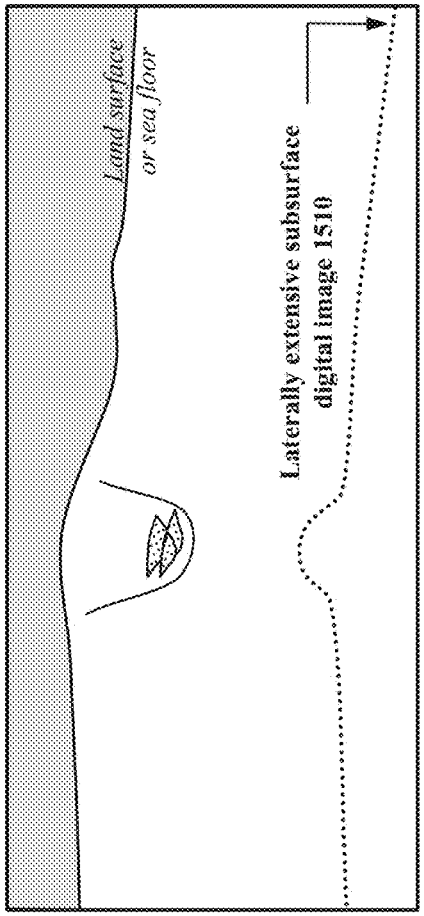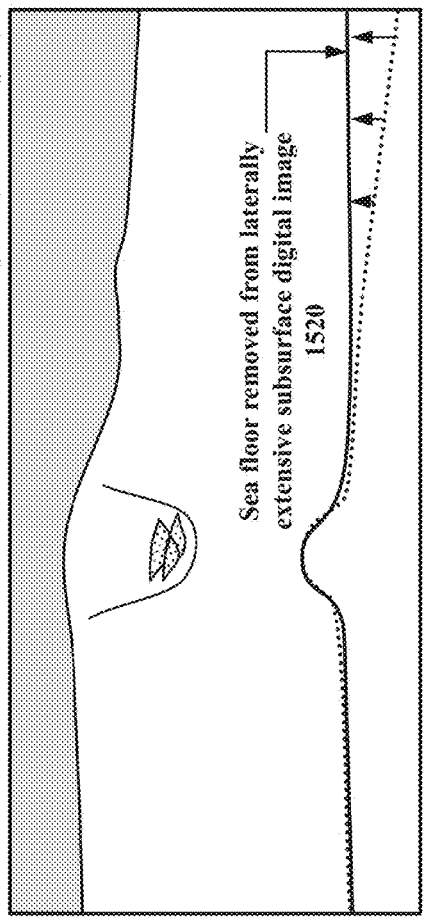
FIG. 15A
FIG. 15B

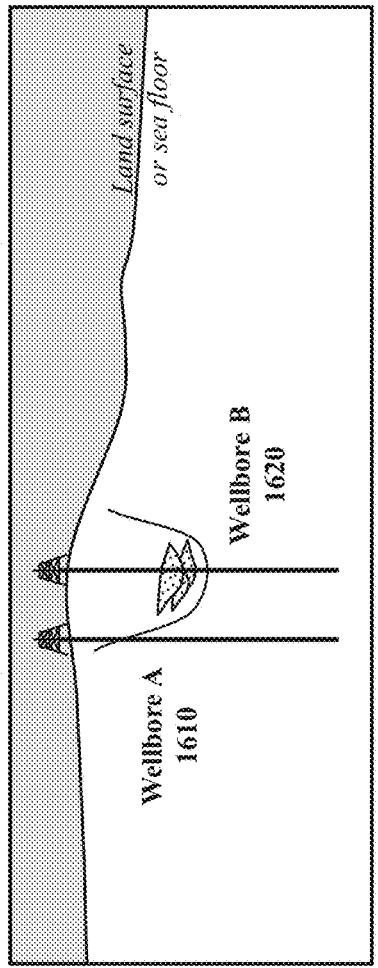
FIG. 16A
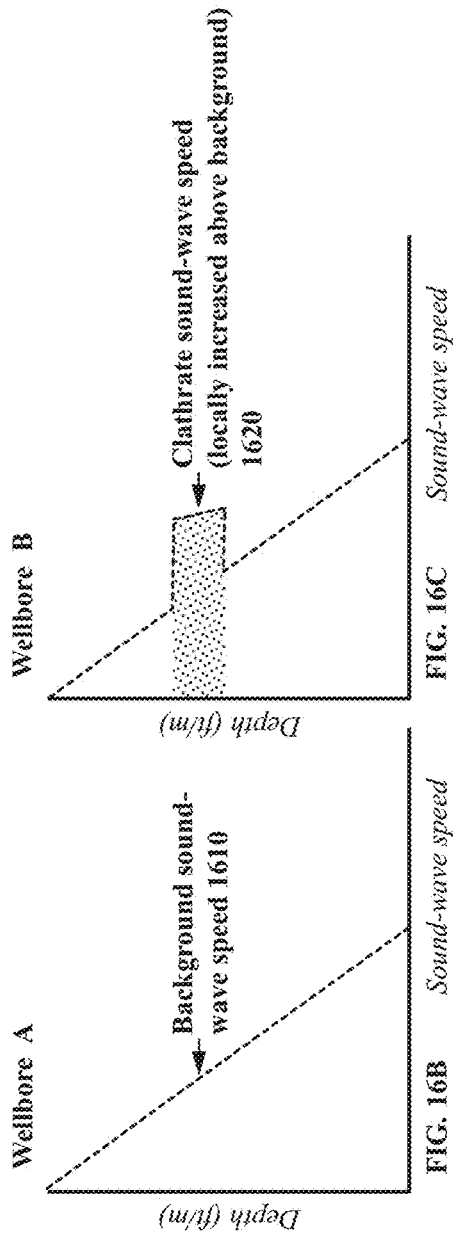
FIG. 16B
FIG. 16C

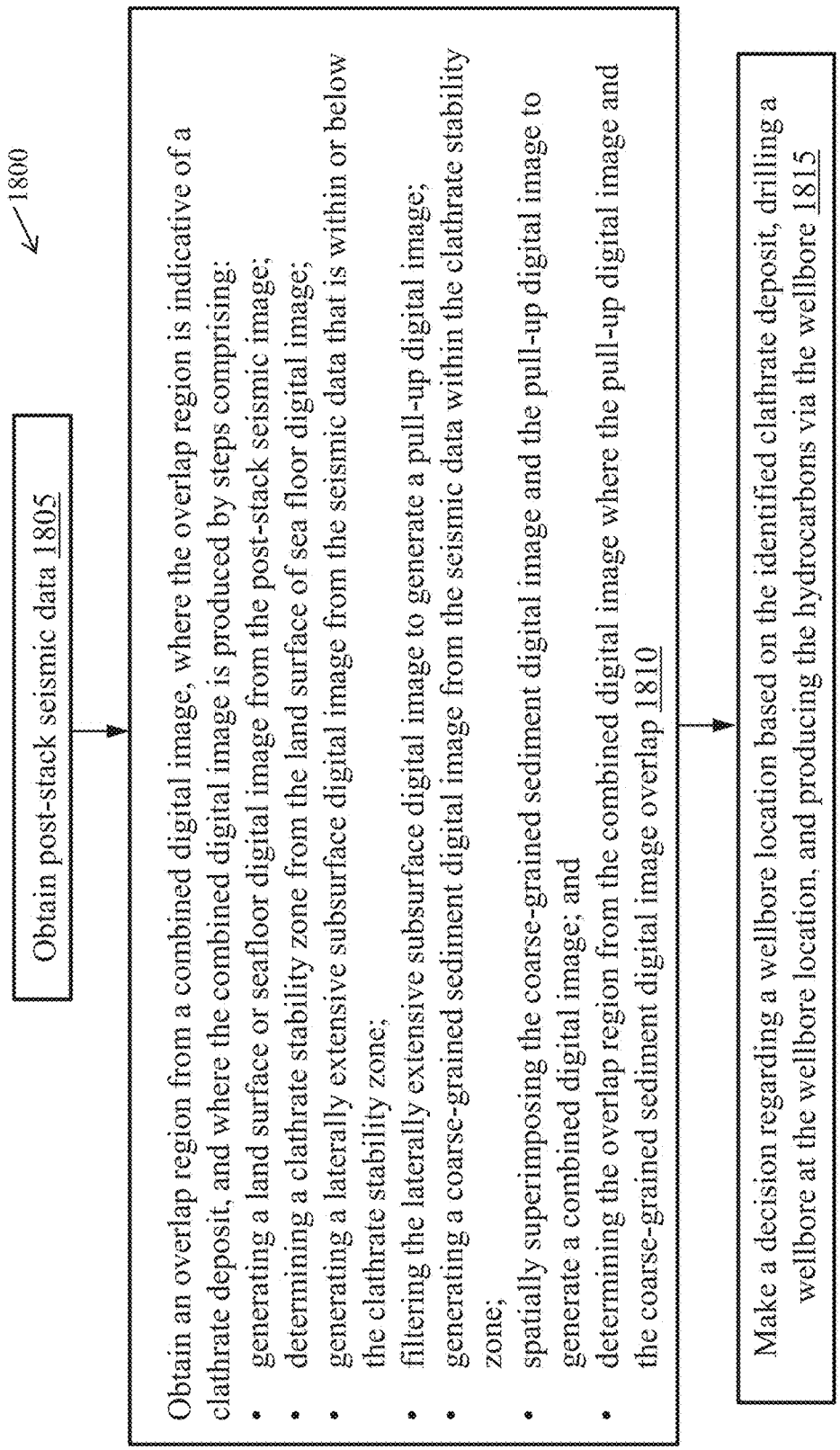

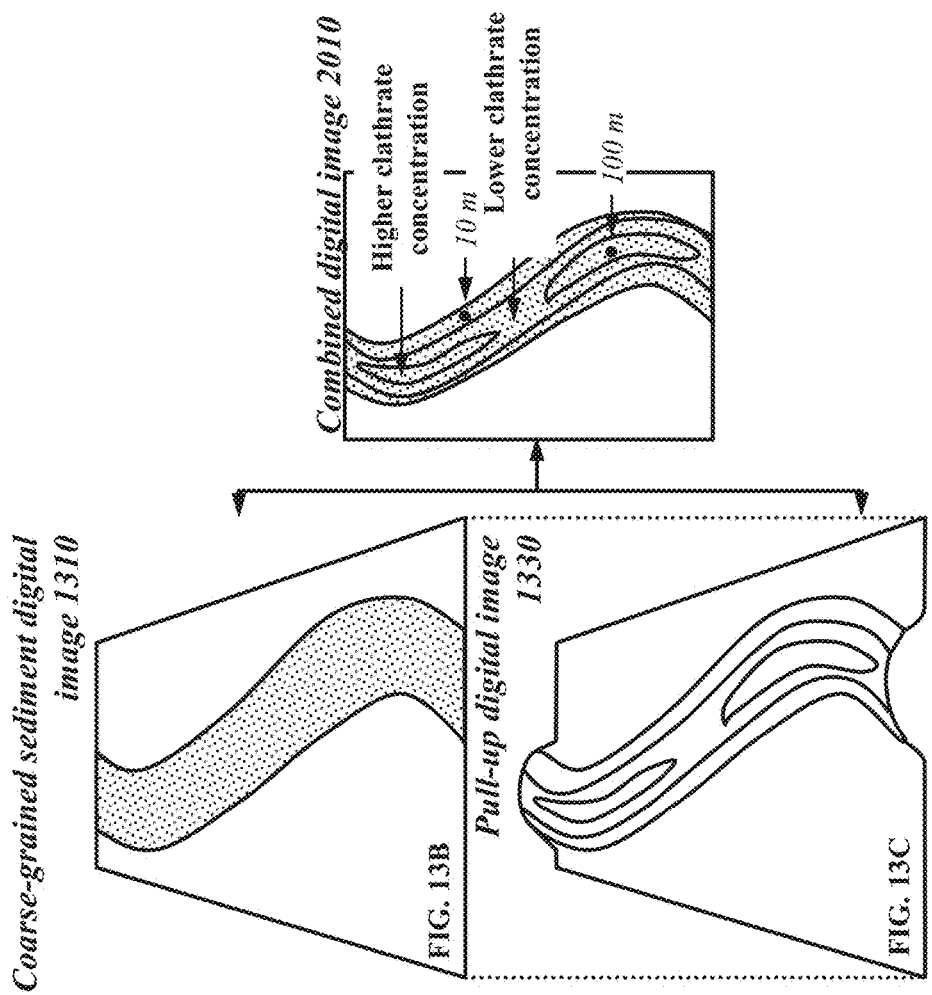

METHODS AND SYSTEMS FOR IDENTIFYING A CLATHRATE DEPOSIT

TECHNICAL FIELD

The present disclosure relates to identifying clathrate deposits.

BACKGROUND

Identifying the presence of hydrocarbons, such as oil and natural gas, relies on using subsurface data to detect hydrocarbon systems. In order to extract hydrocarbon accumulations associated with such a system, Earth scientists typically decide where to place and drill wells (injectors and producers), how to ensure consistent fluid flow into a well, and how to reduce risks.

One set of deposits encountered during the drilling process are a group of compounds known as clathrates, which are frozen gas accumulations typically existing in the shallow subsurface. Clathrate deposits were conventionally considered a drilling hazard, but are now also being thought of as a potential seal and resource.

Current estimates of methane sequestered globally in clathrates is between 100,000 and 5,000,000 TCF with the most frequently quoted estimate of 700,000 TCF (a number which excludes any hydrates located in Antarctic or alpine permafrost areas). Even the lowest estimate represents an enormous potential new energy resource, equal to more than 4,000 times the amount of natural gas consumed in the US or 18 times the entire world's proven gas resources.

Clathrates are substances in which a lattice structure made up of one molecular component (host molecules) traps or encases another molecular component (guest molecules); they resemble crystal-like structures. Clathrates can be found in relatively low temperature and relatively high pressure environments in deep-water (ocean) and permafrost (terrestrial) areas within the clathrate stability zone. Large quantities of hydrocarbon gas are closely packed together by this mechanism. For example, a cubic meter of natural gas hydrate contains approximately 0.8 cubic meters of water and generally 164 cubic meters of natural gas at standard (surface) temperature and pressure conditions.

The thickness of the clathrate stability zone varies with temperature, pressure, composition, and availability of the hydrate-forming gas, underlying geologic conditions, water depth, salinity, and other factors. The clathrate stability zone is an interval with a top and base. Within the zone, if hydrocarbons are present, they generally occur in a frozen state. Below the clathrate stability zone, increased pressure and temperature force hydrocarbons into a gaseous state. The top of the zone is regularly defined as the sea floor (transition from ocean water to sediment).

The current state of the art for identifying clathrate deposits from seismic data relies on using a bottom simulating reflector (BSR) as a proxy for the base of the clathrate stability zone (FIG. 1A). The BSR is thought to delineate an abrupt phase change (e.g., solid to gas) from frozen gas (clathrates) above to free gas below it. One disadvantage of using the BSR to delineate the base of the clathrate stability zone is that the BSR is often present where no clathrate deposits exist, and vice versa (FIG. 1B).

Furthermore, the current state of the art for quantifying clathrate deposits relies on either modeling an estimated clathrate volume and saturation, or on taking direct measurements via drilling at least one well. Both techniques are regularly performed in one dimension (1D), and therefore do not account for the three dimensional (3D) volume of the clathrate deposits themselves.

As such, an improved manner of identifying clathrate deposits is needed.

SUMMARY

Various embodiments of identifying a clathrate deposit in a subsurface from seismic data are provided. In one embodiment, a method of identifying a clathrate deposit in a subsurface from seismic data includes using a computing system in generating a land surface or sea floor digital image from post-stack seismic data; determining a clathrate stability zone from the land surface or sea floor digital image; generating a laterally extensive subsurface digital image from the seismic data that is within or below the clathrate stability zone; filtering the laterally extensive subsurface digital image to generate a pull-up digital image; generating a coarse-grained sediment digital image from the seismic data within the clathrate stability zone; spatially superimposing the coarse-grained sediment digital image and the pull-up digital image to generate a combined digital image; and determining an overlap region from the combined digital image where the pull-up digital image and the coarse-grained sediment digital image overlap. The overlap region is indicative of a clathrate deposit.

In one embodiment, a system of identifying a clathrate deposit in a subsurface from seismic data includes a processor and a memory communicatively connected to the processor, the memory storing computer-executable instructions which, when executed, cause the processor to perform: generating a land surface or sea floor digital image from post-stack seismic data; determining a clathrate stability zone from the land surface or sea floor digital image; generating a laterally extensive subsurface digital image from the seismic data that is within or below the clathrate stability zone; filtering the laterally extensive subsurface digital image to generate a pull-up digital image; generating a coarse-grained sediment digital image from the seismic data within the clathrate stability zone; spatially superimposing the coarse-grained sediment digital image and the pull-up digital image to generate a combined digital image; and determining an overlap region from the combined digital image where the pull-up digital image and the coarse-grained sediment digital image overlap. The overlap region is indicative of a clathrate deposit.

In one embodiment, a computer-readable medium includes computer-executable instructions stored thereon which, when executed by a computing system, cause a computing system to perform a method of identifying a clathrate deposit in a subsurface from seismic data. The method includes generating a land surface or sea floor digital image from post-stack seismic data; determining a clathrate stability zone from the land surface or sea floor digital image; generating a laterally extensive subsurface digital image from the seismic data that is within or below the clathrate stability zone; filtering the laterally extensive subsurface digital image to generate a pull-up digital image; generating a coarse-grained sediment digital image from the seismic data within the clathrate stability zone; spatially superimposing the coarse-grained sediment digital image and the pull-up digital image to generate a combined digital image; and determining an overlap region from the combined digital image where the pull-up digital image and the coarse-grained sediment digital image overlap. The overlap region is indicative of a clathrate deposit.

Also provided herein are embodiments of producing hydrocarbons. In one embodiment, a method of producing hydrocarbons includes obtaining post-stack seismic data and obtaining an overlap region from a combined digital image, where the overlap region is indicative of a clathrate deposit, and where the combined digital image is produced by steps comprising: generating a land surface or seafloor digital image from the post-stack seismic image; determining a clathrate stability zone from the land surface of sea floor digital image; generating a laterally extensive subsurface digital image from the seismic data that is within or below the clathrate stability zone; filtering the laterally extensive subsurface digital image to generate a pull-up digital image; generating a coarse-grained sediment digital image from the seismic data within the clathrate stability zone; spatially superimposing the coarse-grained sediment digital image and the pull-up digital image to generate a combined digital image; and determining the overlap region from the combined digital image where the pull-up digital image and the coarse-grained sediment digital image overlap. Furthermore, the method includes making a decision regarding a wellbore location based on the identified clathrate deposit, drilling a wellbore at the wellbore location, and producing the hydrocarbons via the wellbore.

BRIEF DESCRIPTION OF THE FIGURES

Other features described herein will be more readily apparent to those skilled in the art when reading the following detailed description in connection with the accompanying drawings, wherein:

FIG. 1A illustrates a diagram of an example where a BSR is indicative of clathrate presence. FIG. 1B illustrates a diagram of an example where the BSR is not indicative of clathrate presence.

FIG. 4 is a digital image illustrating one example of seismic data in cross section, with the seafloor identified.

FIG. 5 is a digital image illustrating one example of a land surface or sea floor digital image. More specifically, FIG. 5 illustrates a 3D view of the sea floor digital image (in two way travel time—TWTT) and the seismic data in cross section of FIG. 4.

FIGS. 6A, 6B, and 6C illustrate one embodiment of a technique for determining a clathrate stability zone. More specifically, FIG. 6A illustrates the portion of the technique for establishing temperatures. FIG. 6B illustrates the portion of the technique for superimposing a gas stability curve. FIG. 6C illustrates the portion of the technique for delineating the clathrate stability zone.

FIG. 8 is digital image illustrating one example of a laterally extensive subsurface image (in 3D) displayed in TWTT.

FIG. 9 is the same digital image as FIG. 8, but converted to depth.

FIG. 11 is a digital image illustrating one example of a pull-up digital image.

FIG. 12A illustrates a seismic cross section (TWTT) with one example of a pull-up digital image (2D). FIGS. 12B, 12C, 12D, 12E, 12F, and 12G illustrate additional examples of seismic cross sections with pull-ups, with arrows pointing to clathrate-filled sands illustrated in circles in the shallow subsurface.

FIG. 13A illustrates the clathrate-filled sands of FIG. 13B and the associated pull-up of FIG. 13C. FIG. 13B illustrates a 3D view of a digital image that is one example of a coarse-grained sediment digital image based on amplitude and impedance. FIG. 13C illustrates a 3D view of a digital image that is one example of a pull-up digital image.

FIG. 14A is a digital image of one example of a combined digital image generated by superimposing the coarse-grained sediment digital image of FIG. 13B and the pull-up digital image of FIG. 13C.

FIG. 15A illustrates an example of a pull-up in TWTT. FIG. 15B illustrates the pull-up, converted to depth, and with effect of the seafloor removed. Thus, FIG. 15A to FIG. 15B illustrate a time-to-depth conversion.

FIG. 16A illustrates example clathrate deposits and the location of two example wells; well A is located in non-clathrate sediments, whereas well B intersects clathrate-filled sediments. FIG. 16B illustrates the linear increase in sound-wave speed of well A (non-clathrate sediments), while FIG. 16C illustrates the nonlinear increase in sound-wave speed of well B (clathrates sediments). Thus, FIGS. 16A, 16B, and 16C illustrate a summary of the properties of clathrate deposits with respect to sound-wave speed.

FIG. 18 is a flowchart illustrating one embodiment of a method of producing hydrocarbons.

FIG. 20A is a modified version of the combined digital image of FIG. 14A. FIG. 20B illustrates one example of quantifying gross clathrate thickness using sound-wave speed of clathrates and background deposit based on FIG. 20A.

FIGS. 21A and 21B illustrate an example of calculating net clathrate thickness.

Figure 2:
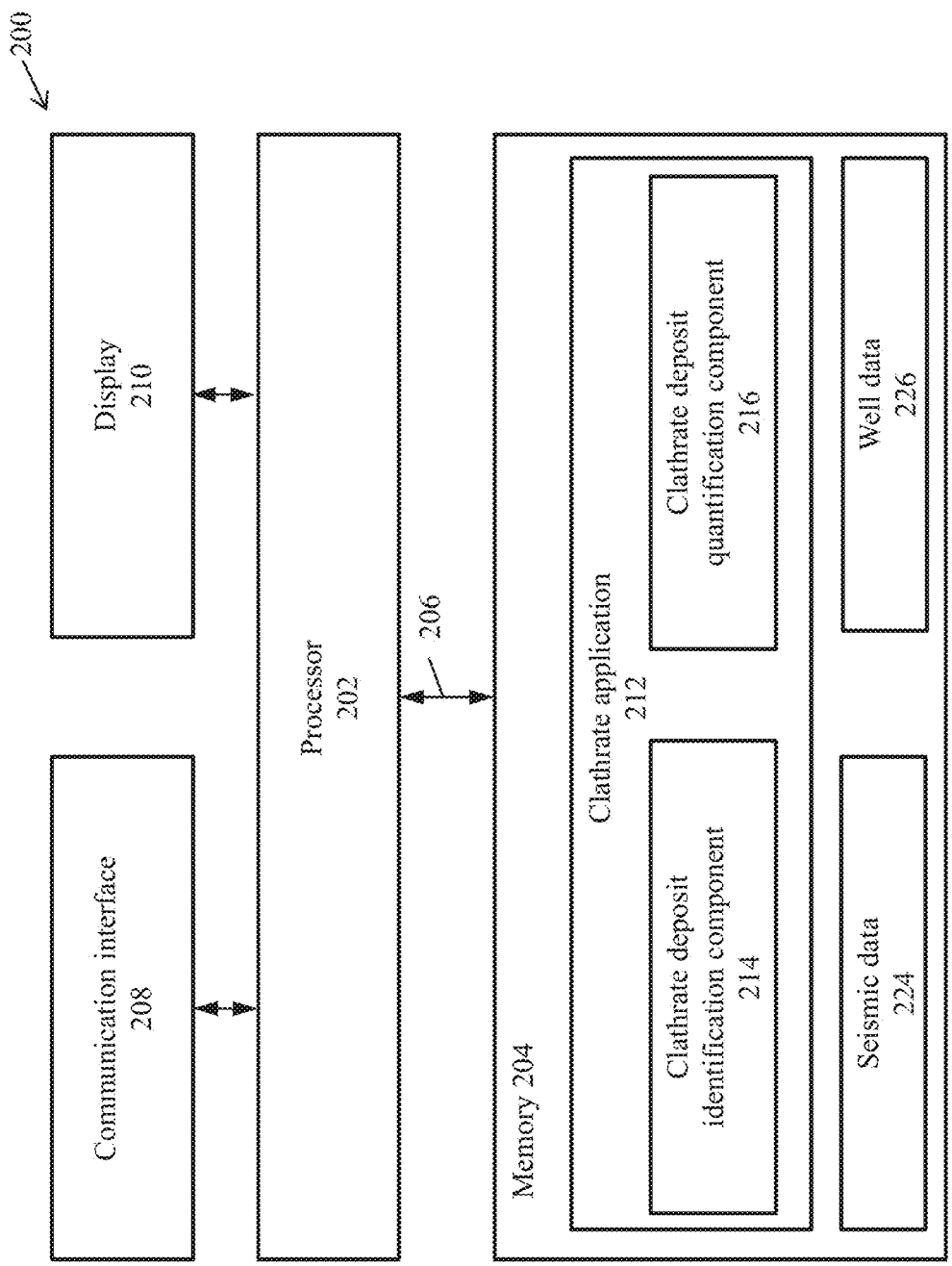
FIG. 2 illustrates one embodiment of a computing system for identifying and quantifying clathrate deposits.

The figures, embodiments, and examples provided herein are not necessarily drawn to scale, and instead, the emphasis has been placed upon clearly illustrating the principles of the present disclosure. Moreover, in the figures, like reference numerals designate corresponding parts throughout the several views.

DETAILED DESCRIPTION

Terminology

The following terms will be used throughout the specification and will have the following meanings unless otherwise indicated:

"Amplitude" refers to the strength of a reflection on seismic data.

"Background sound-wave speed" refers to the speed of a sound wave as it travels through non-clathrate-bearing rocks or non-clathrate-bearing sediments.

"Base clathrate stability zone (BCSZ)" refers to the lowest position where gas occurs in a frozen state (clathrates).

"Bottom simulating reflector (BSR)" refers to a reflection mimicking the sea floor, found at the base of clathrate stability zone and indicating a change from frozen (above) to free gas (below).

"Clathrate" refers to substances in which a lattice structure made up of one molecular component (host molecules) traps or encases another molecular component (guest molecules); they resemble crystal-like structures. An example of a clathrate is methane, carbon dioxide, or other gaseous hydrate.

"Clathrate deposit" refers to practically any deposit that contains or is likely to contain clathrates. "Clathrate-filled sands" are one example of a clathrate deposit. "Clathrate-filled sands" refer to sand or other coarse-grained sediment or rocks found in the subsurface in association with clathrates. Clathrates fill the pore spaces of the sand deposits.

"Clathrate sound-wave speed" refers to the speed of a sound wave as it travels through clathrate-filled sands or clathrate-filled sediments.

"Clathrate stability zone" refers to a region of the subsurface where frozen gas deposits naturally exist. The thickness of the zone varies with temperature, pressure, composition, and availability of the clathrate-forming gas, underlying geologic conditions, water depth, salinity, and other factors.

"Coarse-grained sand digital image" refers to an image created from seismic data showing a change in amplitude, impedance, or other seismic attribute, indicating the presence of clathrate-filled sands.

"Combined digital image" refers to an image created by overlapping a coarse-grained sand digital image and a pull-up digital image. For example, the coarse-grained sand digital image may be superimposed over the pull-up digital image.

"Concentration" refers to a constituent substance divided by the total volume.

"Deep subsurface" occurs far from the land surface or sea floor. For example, the deep subsurface may be up to 10 km below the land surface or sea floor.

"Density (Rho)" refers to mass per unit volume. Density is usually measured in $gm/cm^3$.

"Direct values" refer to values obtained by direct measurement.

"Filter" refers to a technique used to isolate an artifact, such as a pull-up.

"Gamma ray (GR)" refers to a log of natural radioactivity in sediments or rocks. Gamma rays are usually measured in API units. Sand regularly has lower gamma ray values when compared to shale.

"Gas" refers to hydrocarbons or other compounds existing in a gaseous state, meaning neither liquid nor solid. For example, gas may include, but is not limited to, water vapor, methane, pentane, or carbon dioxide.

"Gas stability curve" refers to a curve showing the stability of gas with increasing depth and temperature. When calculating the clathrate stability zone, if the gas stability curve is located to the right of the geothermal gradient, deposits are stable in a frozen state; if the gas stability curve is located to the left of the geothermal gradient, deposits are stable in a gaseous state.

"Geothermal gradient" refers to the increase in temperature with increasing subsurface depth.

"Gross clathrate thickness" refers to a measurement over a larger interval.

"Impedance" refers to the product density and sound-wave speed through a medium.

"Laterally extensive subsurface digital image" refers to an image created by mapping a subsurface reflection displaying areal continuity.

"Land surface or sea floor digital image" refers to an image of the land surface or sea floor generated from the seismic data.

"Map" refers to a graphical representation showing a subset of the Earth, which identifies features (e.g., sand-prone deposits, faults, folds, etc.).

"Maximum" refers to a local highest value.

"Minimum" refers to a local lowest value.

"Modeled values" refer to values estimated via a set of physics- or mathematics-derived equations.

"Net clathrate thickness" refers to measurement over a smaller interval, which is a subset of the gross clathrate thickness.

"Pore space" refers to void spaces in a material.

"Porosity" refers to the percentage of void space of a given material.

"Pressure gradient" refers to the change in pressure with increasing depth.

"Pull-up" refers to an artifact caused by an increase in sound-wave speed, resulting in an apparent structural high.

"Pull-up digital image" refers to an image generated by using a filter on a laterally extensive subsurface digital image, to generate a pull-up digital image.

"Reflector" refers to the physical interface that separates two geologic units with different physical properties.

"Reflection" refers to a graphical representation of the change in subsurface properties caused by a physical interface known as a reflector.

"Resistivity (R)" refers to the ability of a material to resist electrical conduction. Resistivity is usually measured in ohm-meters.

"Sand" refers to relatively coarse-grained sediment.

"Seismic attribute" refers to an extracted value derived from seismic data that can be used to enhance information that appears more subtle on a traditional seismic digital image. Examples of seismic attributes include coherence, spectral decomposition, sweetness, attenuation, and curvature, which are available from the following third parties: Paradigm Limited, Schlumberger Limited, Landmark business line from Halliburton Company, Compagnie Générale de Géophysique-Veritas, dGB Earth Sciences B.V., Foster Findlay Associates Limited, etc.

"Seismic data" refers to 2D or 3D digital image(s) of the subsurface obtained by sending sound waves through the Earth via at least one source and recording their arrival with at least one receiver. "Post-stack seismic data" refers to processed digital images ready for seismic interpretation.

"Shallow subsurface" occurs near the land surface or sea floor. For example, the shallow subsurface may be up to 1 km below the land surface or sea floor.

"Sound-wave speed (Sp)" refers to the speed of a sound wave as it travels through a medium.

"Temperature gradient" refers to the change in temperature with depth.

"Two way travel time (TWTT)" refers to the time it takes for a seismic wave to travel from the source(s), to the reflector, and back to the receiver(s).

"Wellbore" refers to a single hole for use in hydrocarbon recovery. For example, a wellbore may be a cylindrical hole drilled into the subsurface used to explore for accumulations of hydrocarbons. The wellbore can be used for injection, production, or both. The wellbore may include casing, liner, tubing, heating elements, any combinations thereof, etc. The wellbore may include an openhole portion or uncased portion. The wellbore is surrounded by the formation, rocks, sands, sediments, etc. The wellbore may have vertical, inclined, horizontal, or combination trajectories. The wellbore may include any completion hardware that is not discussed separately. The term wellbore is not limited to any structure and configuration described herein. The term wellbore may be used synonymously with the terms borehole or well.

"Well data" refers to practically any well data that may be obtained. For example, the well data may include, but is not limited to, density (Rho), resistivity (R), gamma ray (GR), sound-wave speed (Sp), or any combination thereof. Well data may include direct measurements by one or more sensors in a wellbore, which measure gamma ray, electrical, acoustic, electromagnetic, nuclear magnetic resonance, pressure, and/or other properties of the subsurface. Well data may include practically any data that is downhole (e.g., well logs, cores, data from sensors, etc.).

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

Unless defined otherwise, all technical and scientific terms used herein have the same meanings as commonly understood by one of skill in the art to which the disclosed invention belongs.

Hardware and Software:

Turning to FIG. 2, this figure illustrates an embodiment of a computing system for identifying a clathrate deposit and quantifying a clathrate deposit. In general, the computing system 200 includes a processor 202 communicatively connected to a memory 204 via a data bus 206. The processor 202 can be any of a variety of types of programmable circuits capable of executing computer-readable instructions to perform various tasks, such as mathematical and communication tasks. The computing system 200 may be a computer, a wireless device, a wired device, a plurality of networked devices, etc.

The memory 204 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory stores a clathrate application 212, discussed in further detail below.

The computing system 200 can also include a communication interface 208 configured to receive data such as at least a portion of seismic data 224, at least a portion of well data 226, or both. Other data may be received via the communication interface 208. The communication interface 208 may also be configured to transmit images (e.g., transmit a combined digital image or other digital image generated herein that identifies a clathrate deposit, etc.), transmit data (e.g., transmit net clathrate thickness as generated herein that quantifies a clathrate deposit, etc.), or other functionality.

Additionally, a display 210 can be used for presenting a user interface associated with the clathrate application 212. In various embodiments, the computing system 200 can include additional components, such as peripheral I/O devices, for example, to allow a user to interact with the user interface associated with the clathrate application 212. For example, the display 210 and the peripheral I/O devices may allow a user to provide user input, view and edit settings, manipulate digital images such as the digital images generated herein, verify presence of an identified clathrate deposit (e.g., verify in cross section, map view, or any combination thereof) (e.g., verify using well data), or other functionality. In some embodiments, the user may even provide at least a portion of the seismic data 224, at least a portion of the well data 226, or both via the user interface.

In various embodiments, the computing system 200 may allow for interaction with at least one other software item, at least one other hardware item, or both (i) to determine seismic attributes such as coherence, spectral decomposition, sweetness, attenuation, and curvature, which are available from the following third parties: Paradigm Limited, Schlumberger Limited, Landmark business line from Halliburton Company, Compagnie Générale de Géophysique-Veritas, dGB Earth Sciences B.V., Foster Findlay Associates Limited, etc., (ii) to carry out one or more claim elements, or (iii) other functionality.

In various embodiments, the clathrate application 212 includes a clathrate deposit identification component 214 and a clathrate deposit quantification component 216. The clathrate deposit detection component 214 uses the seismic data 224 to generate a variety of digital images, including a combined digital image, and a clathrate deposit may be identified in the combined digital image. The clathrate deposit quantification component 216 uses the seismic data 224 to calculate a gross clathrate thickness and a net clathrate thickness to quantify a clathrate deposit (e.g., the clathrate deposit identified from the combined digital image). In some embodiments, the component 214 may present at least one user interface to the user in order for the user to provide user input. Similarly, the component 216 may present at least one user interface to the user in order for the user to provide user input. In some embodiments, the components 214-216 may be a single component, or alternatively, the components 214-216 may be more than two components. Furthermore, in some embodiments, the clathrate application 212 may interact with software, hardware, or both from a third party, such as interact with at least one application from a third party. In short, those of ordinary skill in the art will appreciate that various modifications may be made and the scope of the claims is not limited to the discussion herein. For example, those of ordinary skill in the art will appreciate that the inventive principles may be implemented using automated steps only or using a combination of automated steps and manual steps.

Clathrate Deposit Identification Using Seismic Data—

Provided herein are embodiments of a method, a system, and a program product for identifying a clathrate deposit in a subsurface from seismic data. In one embodiment, the method includes using a computing system in: generating a land surface or sea floor digital image from post-stack seismic data; determining a clathrate stability zone from the land surface or sea floor digital image; generating a laterally extensive subsurface digital image from the seismic data that is within or below the clathrate stability zone; filtering the laterally extensive subsurface digital image to generate a pull-up digital image; generating a coarse-grained sediment digital image from the seismic data within the clathrate stability zone; spatially superimposing the coarse-grained sediment digital image and the pull-up digital image to generate a combined digital image; and determining an overlap region from the combined digital image where the pull-up digital image and the coarse-grained sediment digital image overlap. The overlap region is indicative of a clathrate deposit.

Provided herein are embodiments of a method of producing hydrocarbons. In one embodiment, the method includes obtaining post stack seismic data; obtaining an overlap region from a combined digital image, where the overlap region is indicative of a clathrate deposit, and where the combined digital image is produced by steps comprising: generating a land surface or seafloor digital image from the post-stack seismic image; determining a clathrate stability zone from the land surface of sea floor digital image; generating a laterally extensive subsurface digital image from the seismic data that is within or below the clathrate stability zone; filtering the laterally extensive subsurface digital image to generate a pull-up digital image; generating a coarse-grained sediment digital image from the seismic data within the clathrate stability zone; spatially superimposing the coarse-grained sediment digital image and the pull-up digital image to generate a combined digital image; and determining the overlap region from the combined digital image where the pull-up digital image and the coarse-grained sediment digital image overlap; and making a decision regarding a wellbore location based on the identified clathrate deposit, drilling a wellbore at the wellbore location, and producing the hydrocarbons via the wellbore.

Advantageously, those of ordinary skill in the art will appreciate that the embodiments provided herein may identify clathrate deposits more accurately from seismic data because the embodiments do not rely on BSR(s). As illustrated in example 100 in FIG. 1A, for decades, identification of clathrate deposits has solely relied on using BSR(s), such as BSR 110, to predict the presence of a clathrate deposit, such as clathrate-filled sands 105. Yet, as illustrated in similar example 115 in FIG. 1B, BSR(s) have been found without the presumed presence of a clathrate deposit, such as clathrate-filled sands 120. For example, the Opal A-CT transition produces a BSR, such as BSR 125, because of a change and increase in reflectivity (change in crystalline structure), not because of the presence of the clathrate-filled sands 120. Additionally, where the clathrate-filled sands 120 are thought to exist without the presence of a BSR, their presence is predicted using water depth, temperature, and pressure changes in both seawater and in the subsurface, and is based on gas and water geochemistry, but not based on a seismic data-driven approach. Thus, the seismic data-driven approach provided herein sharply departs from the convention of using BSR(s) to identify the presence of a clathrate deposit and areal extent.

Indeed, those of ordinary skill in the art will appreciate that in a real operating environment, deciphering the presence and extent of clathrate-filled sands can be very complex. FIGS. 1A-1B are provided to facilitate understanding of clathrate-filled sands. FIG. 1A illustrates the clathrate stability zone delineated by the sea floor (top) and BSR (base), which is coincident with the base clathrate stability zone, and the presence of clathrate-filled sands. While FIG. 1B illustrates a clathrate system where the BSR is not indicative of clathrates and clathrate accumulations are not marked by the presence of a BSR. The inventive concepts provided herein disclose embodiments to identify clathrate deposits, such as clathrate-filled sands, without using a BSR. If desired, a BSR may be used as one methodology to verify a clathrate deposit that is identified with the embodiments herein, but no BSR is necessary. FIG. 1B serves as the starting point of the running example used herein.

Advantageously, those of ordinary skill in the art may appreciate that the embodiments provided herein rely on a seismic data-driven approach to identify the clathrate deposit. The seismic data-driven approach does not require any prior geophysical knowledge of the subsurface, for example, the following are not required: well data, core samples, tomographic information, velocity measurements, velocity models, smoothed velocity models, or anomalous velocity models. The seismic data-driven approach also does not require any geologic knowledge of the subsurface, for example, the following are not required: digital images of subsurface sand and shale deposits, digital images of the configuration and geometry of the subsurface, or knowledge about porosity or permeability trends. Moreover, the seismic data-driven approach makes no assumption of the subsurface and can be utilized in practically any area (e.g., onshore, offshore—shallow water or deep water, etc.), with few to no wellbores or associated downhole data (e.g., well logs, cores, sensors, etc.). If desired, well data, etc. may be used as one methodology to verify a clathrate deposit identified with the embodiments herein, but no well, etc. is necessary. As such, quantitative methods, such as inversions or simulations, are unnecessary to detect a clathrate deposit, based on the technique provided herein.

Advantageously, the embodiments provided herein use digital image processing to generate a combined digital image from a coarse-grained sediment digital image and a pull-up digital image. The overlap region in the combined digital image is indicative of clathrate presence. As such, those of ordinary skill in the art may appreciate that the embodiments provide an innovation in computer technology, namely digital image processing, which reflects both an improvement in the functioning of a computing system, such as computer, and an improvement in another technology, such as hydrocarbon exploration and production technology.

Advantageously, those of ordinary skill in the art will appreciate that decisions may be made regarding wellbore location and wellbore quantity based on the identified clathrate deposit. The identified clathrate deposit can be used as a hydrocarbon top seal, or avoided depending on the desired outcome. If the desired outcome is to produce the identified clathrate deposit, those of ordinary skill in the art will appreciate that decisions about where to drill one or more wellbores can be made based on the identified clathrate deposit. Furthermore, if the desired outcome is to produce the identified clathrate deposit, those of ordinary skill in the art will appreciate that decisions about how many wellbores to drill can be made based on the identified clathrate deposit. If the desired outcome is to avoid the identified clathrate deposit, those of ordinary skill in the art will appreciate that the location of the identified clathrate deposit can be used to make decisions about where not to drill wellbores or where to drill wellbores so as to avoid the identified clathrate deposit. Furthermore, if the desired outcome is to avoid the identified clathrate deposit, those of ordinary skill in the art will appreciate that decisions about how many wellbores to drill can be made to avoid the identified clathrate deposit.

Additionally, those of ordinary skill in the art will appreciate that decisions about which completions, components, fluids, etc. to select for the one or more wellbores to be drilled, including the configuration of the one or more wellbores (e.g., vertical, horizontal, etc.), can also be made based on the identified clathrate deposit. For example, casing, tubing, packers, heaters, sand screens, gravel packs, items for fines migration, etc. may be selected based on the identified clathrate deposit. Moreover, methodologies to produce the identified clathrate deposit may also be selected based on the identified clathrate deposit. Some methodologies and devices that may be used to produce the identified clathrate deposit, such as a hydrate deposit, are provided in the following patents and patent applications assigned to Chevron U.S.A. Inc.: US Patent App. No. 2015/0090455, U.S. Pat. No. 7,812,203, US Patent App. No. 2008/0102000, U.S. Pat. No. 7,964,150, U.S. Pat. No. 8,201,626, and U.S. Pat. No. 7,537,058, all of which are incorporated herein by reference in their entirety and for all purposes.

Advantageously, those of ordinary skill in the art will appreciate that other decisions may also be made based on the identified clathrate deposit. Moreover, embodiments for quantifying a clathrate deposit, such as the clathrate deposit identified with the techniques provided herein, are also provided herein. The determined quantity of the identified clathrate deposit may also be considered in making decisions based on the identified clathrate deposits. For example, an identified clathrate deposit with a larger quantity of clathrates may lead to the selection of a higher number of wellbore locations and drilling a higher number of wellbores as compared to an identified clathrate deposit with a smaller quantity of clathrates. In short, those of ordinary skill in the art will appreciate that the options are many and making proper decisions based on the identified clathrate deposit should improve the likelihood of safe and reliable operations.

Figure 3:
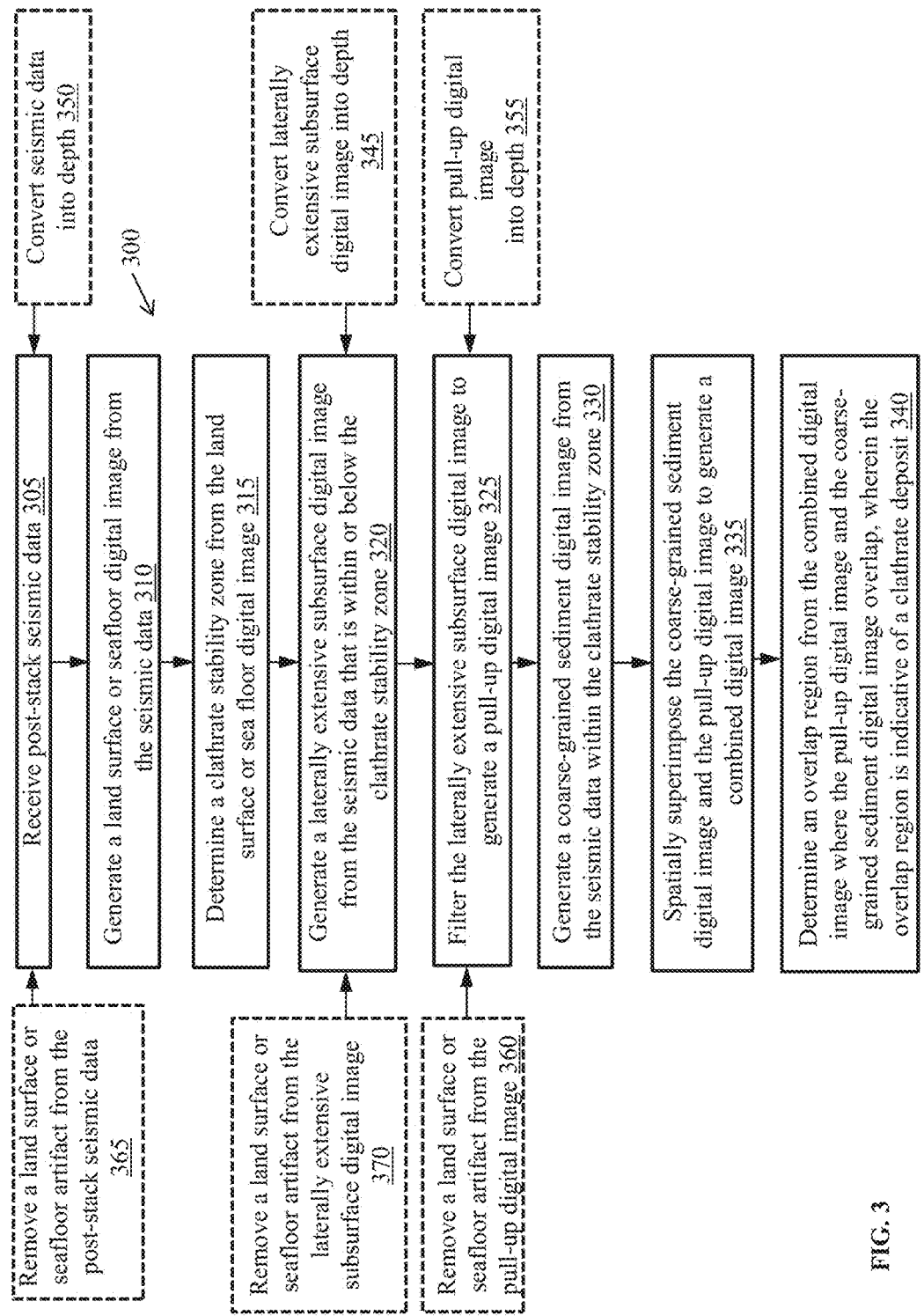
FIG. 3 is a flowchart illustrating one embodiment of a method of identifying a clathrate deposit in a subsurface from seismic data.

Turning to FIG. 3, this figure illustrates one embodiment of a method of identifying a clathrate deposit in a subsurface using seismic data, referred to as a method 300. The method 300 may be executed by the computing system 200 of FIG.

2. For ease of understanding, a running example will be referenced throughout the discussion of the method 300. The running example assumes that a user is interested in a particular subsurface portion of the Earth and wants to know if the subsurface portion of interest contains a clathrate deposit. At the end of the running example, the clathrate deposit in the form of the clathrate-filled sands 120 is identified and it is likely present in the subsurface portion of interest.

For ease of understanding, the clathrate deposit in the form of clathrate-filled sands 120 may be illustrated throughout the running example, but no knowledge of the clathrate deposit (e.g., the clathrate-filled sands 120) is necessary at the onset, as the method 300 is seismic data-driven and makes no assumptions. Those of ordinary skill in the art will appreciate that the clathrate deposit (e.g., the clathrate-filled sands 120) is identified via the method 300 without any well data and without any drilled wellbores. If the desired outcome is to produce the clathrate deposit (e.g., the clathrate-filled sands 120) that is identified, those of ordinary skill in the art will also appreciate that one or more wellbores will have to be drilled in order to truly confirm the presence of the clathrate deposit (e.g., the clathrate-filled sands 120) that is identified and produce the clathrate deposit (e.g., the clathrate-filled sands 120).

At 305, the method 300 includes receiving seismic data. An example of the seismic data that is received may be the seismic data 224 illustrated in FIG. 2. The seismic data 224 may be generated by sending sound waves through the Earth via at least one source (e.g., airgun, vibroseis, etc.) and recording the arrival of the sound waves with at least one receiver (e.g., hydrophone, geophone, etc.). Moreover, the seismic data 224 may be post-stack seismic data, which is seismic data that is processed (e.g., noise has been removed), migrated, stacked, and is ready for interpretation. The post-stack seismic data 224 may be at least one 2D digital image of the subsurface. The post-stack seismic data 224 may be at least one 3D digital image of the subsurface. The post-stack seismic data 224 may be at least one 2D digital image of the subsurface and at least one 3D digital image of the subsurface. A user may provide the coordinates in latitude and longitude or otherwise select the subsurface of interest using the computing system 200, and the computing system 200 may receive the seismic data 224 corresponding to that subsurface of interest from a database, a networked computing system, one or more vendors specializing in generating seismic data, etc.

One example of the seismic data that may be received is illustrated as digital image 400 in FIG. 4. The digital image 400 is illustrated in cross-section, but it is not limited to cross-section. For example, a digital image may be oriented perpendicular to cross-section, as in a map view, such as in a response to user input.

At 310, the method 300 includes generating a land surface or sea floor digital image from the seismic data. If detecting a clathrate deposit onshore is of interest, then the digital image that is generated includes the land surface and potentially a portion of the subsurface below the land surface. If detecting a clathrate deposit offshore is of interest, then the digital image that is generated includes the sea floor and potentially a portion of the subsurface below the sea floor. The computing system 200 may automatically generate the land surface or sea floor digital image from the seismic data by mapping a continuous reflection with seismic interpretation software, such as Epos (Paradigm), Petrel (Schlumberger), or Geoprobe (Landmark). For example, the user provides input to the computing system 200 indicating the location of the reflection, as well as the amplitude of the reflection. After the reflection is selected, the software automatically selects subsequent reflections along the same interface, to within a user-defined threshold. One example of a land surface or sea floor digital image that may be generated from the seismic data is illustrated as digital image 500 in FIG. 5.

At 315, the method 300 includes determining the clathrate stability zone from the land surface or sea floor digital image. The clathrate stability zone refers to a naturally occurring subsurface region of frozen gas, such as frozen clathrates, having a top and a base. The base of the clathrate stability zone (BCSZ) represents the lowest position where gas occurs in a frozen state; below this point, gas occurs in a free state. The top of the clathrate stability zone may be the land surface or the sea floor.

In some embodiments, determining the clathrate stability zone relies on a three part technique of establishing temperatures, superimposing a gas stability curve, and delineating the clathrate stability zone, as illustrated in FIGS. 6A, 6B, and 6C, respectively. For example, FIG. 6A marks the change in temperature at the sea floor from the overlying seawater to the underlying subsurface. The temperature of the subsurface increases with increasing depth, and is termed the geothermal gradient. FIG. 6B illustrates FIG. 6A with a gas stability curve superimposed. The crossover marks the transition from frozen gas (above) to free gas (below). FIG. 6C defines the clathrate stability zone by using the region of frozen gas as a guide. The top of the clathrate stability zone is marked by the sea floor, whereas the base is delineated by the crossover of the gas stability curve and geothermal gradient.

More specifically, as illustrated in chart 600 in FIG. 6A, determining the clathrate stability zone relies on using the sea floor depth 605, the known or estimated value of seawater temperature 610, and the known or estimated value of the geothermal gradient 615. Once those values are plotted, a gas stability curve 620 is superimposed over the chart 600 and the crossover 625 is noted. The crossover 625 represents the point where the gas stability curve 620 intersects the geothermal gradient 615: locations above this point highlight regions where frozen gas exists in a stable form 630, whereas locations below this point delineate regions where free gas exists in a stable form 635. In the region of frozen gas 630, the gas stability curve 620 is located to the right of the geothermal gradient curve 615; in the region of free gas 635, the gas stability curve 620 is located to the left of the geothermal gradient curve 615. The clathrate stability zone 640, as illustrated in FIG. 6C, is delineated by the thickness of the region of frozen gas 630, and is regularly defined by the sea floor (top) 605, and the crossover 625 of the gas stability curve 620 with the geothermal gradient curve (base) 615.

Figure 7:
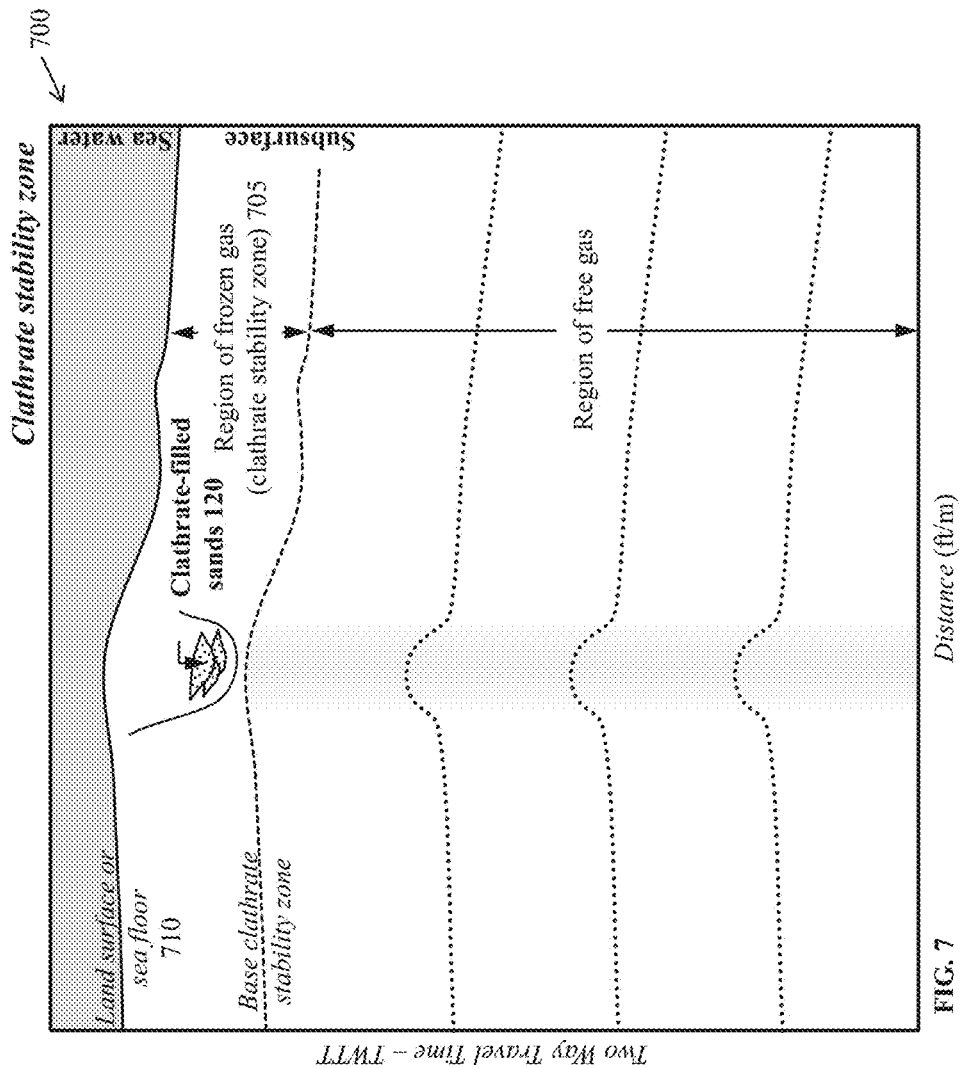
FIG. 7 is a schematic representation of one example of a clathrate stability zone that may be determined.

FIG. 7 is a schematic representation of one example of a clathrate stability zone 705 that may be determined. The example 700 includes the clathrate stability zone 705 that may be determined using the sea floor 710. FIG. 7 also illustrates the clathrate-filled sands 120 with an underlying pull-up. The pull-up is controlled by the increase in sound-wave speed through the clathrate filled-sands 120, which causes a decrease in two-way travel time (TWTT) underneath the deposit.

At 320, the method 300 includes generating a laterally extensive subsurface digital image from the seismic data that is within or below the clathrate stability zone (e.g., within or below the clathrate stability curve). One example of a laterally extensive subsurface digital image, in TWTT, that may be generated from the seismic data is illustrated as digital image 800 in FIG. 8. The laterally extensive subsurface digital image 800 includes a portion of the subsurface that is within the determined clathrate stability zone 705, a portion of the subsurface 820 below the determined clathrate stability zone 705, or both. The laterally extensive subsurface digital image 800 may be generated in time. The computing system 200 may automatically generate the laterally extensive subsurface digital image 800 from the digital image 400 of seismic data in FIG. 4 by mapping a continuous reflection with seismic interpretation software, such as Epos (Paradigm), Petrel (Schlumberger), or Geoprobe (Landmark). For example, the user provides input to the computing system 200 such as indicating the location of the reflection, as well as the amplitude of the reflection. After a reflection is selected, the software automatically selects subsequent reflections along the same interface, to within a user-defined threshold.

One example of a laterally extensive subsurface digital image, in depth, that may be generated is illustrated as digital image 900 in FIG. 9. The digital image 900 is illustrated in cross-section, but it is not limited to cross-section. The digital image 900 may include a portion of the subsurface within the determined clathrate stability zone 705, a portion of the subsurface 920 below the clathrate stability zone 705, or both. The laterally extensive subsurface digital image 900 in cross section includes a potential pull-up 1020, 1030, and 1040 seen in multiple parallel layers of FIG. 10A, such as layers 1025, 1035, and 1045, respectively, in the portion of the subsurface located below the determined clathrate stability zone 705. Another example of a laterally extensive subsurface digital image with pull-up is digital image 1000 in FIG. 10A.

Figures 10A, 10B:
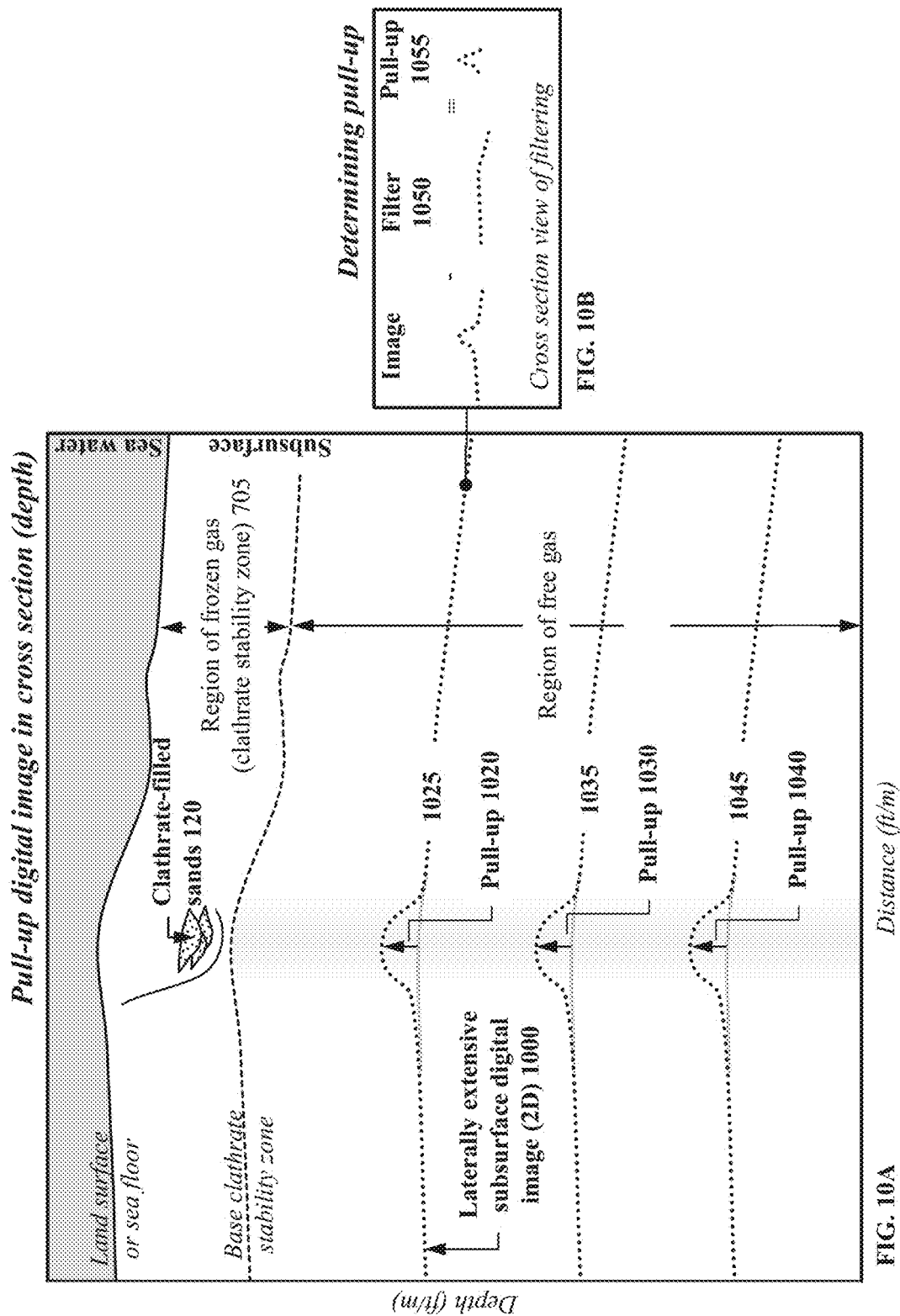
FIG. 10A is an image of one example of the clathrate-filled sands in the shallow subsurface with the associated underlying pull-up. The gray line delineates the base of the pull-up.
FIG. 10B illustrates one example of a methodology for isolating the pull-up in cross section, which is calculated by using a filter on the laterally extensive subsurface digital image.

At 325, the method 300 includes filtering the laterally extensive subsurface digital image to generate a pull-up digital image. FIGS. 10A and 10B illustrate a methodology for isolating the pull-up. As indicated above, FIG. 10A illustrates clathrate-filled sands in the shallow subsurface with the associated underlying pull-up. The gray line delineates the base of the pull-up. FIG. 10B illustrates the isolation of the pull-up in cross section, which is calculated by filtering the laterally extensive subsurface digital image. Filtering the laterally extensive subsurface digital image 900 in FIG. 9 to generate the pull-up digital image 1100 in FIG. 11 includes using a filter 1050 as illustrated in FIG. 10B. The filter 1050 may be a spatial filter, a temporal filter, or any combination thereof. In some embodiments, the filter 1050 may be a Gaussian Regional/Residual Filter. In some embodiments, the filter may be a Lowpass Filter. In some embodiments, the filter may be a Highpass Filter. In some embodiments, the filter may be a Bandpass Filter. In some embodiments, the filter may be a Directional Cosine Filter. In some embodiments, the filter may be any combination thereof, such as both the Residual Filter and the Directional Cosine Filter. More information about filters that may be utilized can be found in the following publications: GEOSOFT INC., "montaj Geophysics How-To Guide", Jan. 16, 2013, pages 1-14 and GEOSOFT INC., "Applying Filters with montaj", Jan. 16, 2013, pages 1-13, both which are incorporated herein by reference in their entirety and for all purposes. One conceptual example of using the filter 1050 on the laterally extensive subsurface digital image 900 to isolate pull-up 1055 (such as the pull-up 1020, 1030, 1040 in FIG. 10A) is illustrated in FIG. 10B. The computing system 200 may automatically filter the laterally extensive subsurface digital image to generate the pull-up image by conducting a Fourier Decomposition on the laterally extensive subsurface digital image.

Figure 12E:
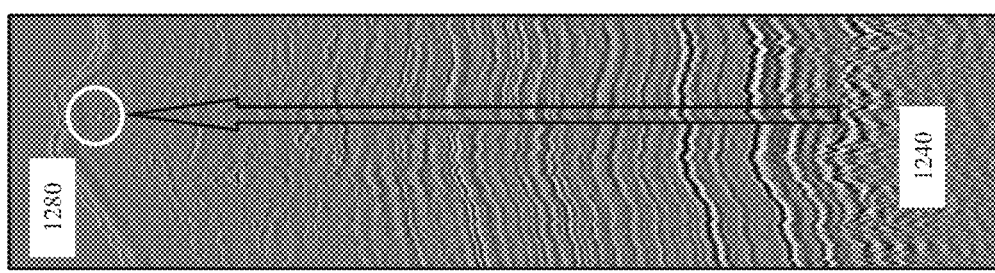
Figure 12D:
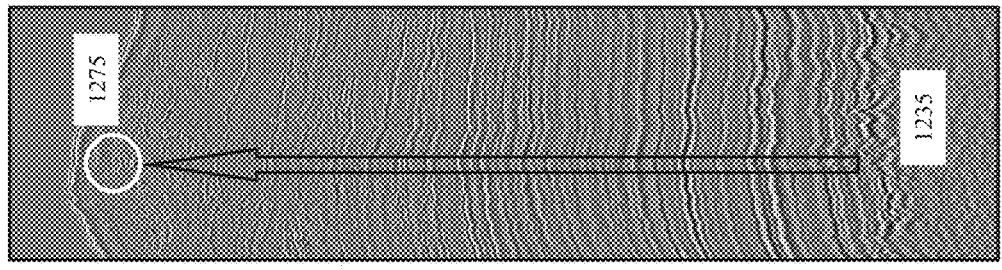
Figure 12C:
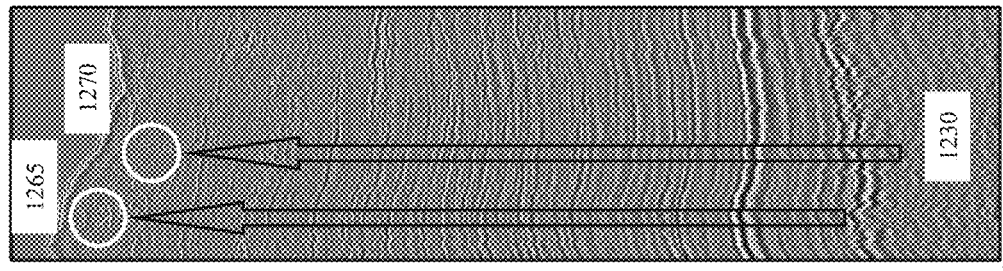
Figure 12B:

Another example of a pull-up digital image is illustrated as digital image 1205 in FIG. 12A. The digital image 1205 relies on a seismic section 1210 illustrated in FIG. 12A, where clathrate-filled sands 1220 are responsible for the pull-up. Other examples of pull-up are illustrated on seismic sections 1225, 1230, 1235, 1240, 1245, and 1250 are illustrated on FIGS. 12B, 12C, 12D, 12E, 12F, and 12G, where clathrate-filled sands 1260, 1265, 1270, 1275, 1280, 1285 and 1290 are responsible for the underlying pull-up. The circles identify clathrate-filled sands and the arrows indicate pull-ups.

At 330, the method 300 includes generating a coarse-grained sediment digital image from the seismic data within the clathrate stability zone. Digital image 1310 in FIG. 13B is one example of a coarse-grained sediment digital image. The coarse-grained sediment digital image 1310 may include coarse-grained sediment such as sand, silt, gravel, or any combination thereof. The coarse-grained sediment digital image 1310 may include other coarse-grained sediments. Generating the coarse-grained sediment digital image 1310 may include using amplitude, impedance, a seismic attribute, reflectivity, or any combination thereof as illustrated at 1320. At 1320, reflectivity and impedance may be determined by the values of reflections on reflectivity and impedance data, respectively. A seismic attribute may be an extracted value derived from seismic data that can be used to enhance information that appears more subtle on a traditional seismic digital image. Examples of a seismic attribute include coherence, spectral decomposition, sweetness, attenuation, curvature, or any combination thereof. Other seismic attributes may also be used. Seismic attributes are available from the following vendors: Paradigm Limited, Schlumberger Limited, Landmark business line from Halliburton Company, Compagnie Générale de Géophysique-Veritas, dGB Earth Sciences B.V., Foster Findlay Associates Limited, etc. Seismic attributes may also be available from other vendors or third parties. The computing system 200 may automatically generate the coarse-grained sediment digital image 1310 from the seismic data of the digital image 400 by identifying a desired value of amplitude on reflectivity and impedance data. In addition to the desired value of amplitude, the computing system 200 may automatically generate the coarse-grained sediment digital image 1310 using a seismic attribute defined by a desired value. The digital image 1310 is related to amplitude changes in reflectivity and impedance at 1320.

FIG. 13C provides a digital image 1330, which is another example of a pull-up digital image 1330 that may be generated by filtering (e.g., with the filter 1050 of FIG. 10B) the laterally extensive subsurface digital image 900 of FIG. 9. The pull-up digital image 1330 is illustrated in a 3D view, but it is not limited to a 3D view. FIG. 13C illustrates the pull-up 1340 of the digital image 900 minus the filter 1050, which results in the pull-up digital image 1330. FIG. 13A illustrates the digital images 1310 and 1330 in context.

At 335, the method 300 includes spatially superimposing the coarse-grained sediment digital image and the pull-up digital image to generate a combined digital image. For example, digital image 1400 in FIG. 14A is one example of a combined digital image. The combined digital image 1400 is generated by superimposing the coarse-grained sediment digital image 1310 and the pull-up digital image 1330. In some embodiments, the pull-up digital image 1330 may be spatially superimposed over the coarse-grained sediment digital image 1310. In some embodiments, only the pull-up digital image 1330 may be used. The computing system 200 may automatically spatially superimpose (matching geospatial references) the coarse-grained sediment digital image 1310 and the pull-up digital image 1330 to create the combined digital image 1400. The combined digital image 1400 is used to detect clathrate presence: higher values of pull-up in the pull-up digital image 1330 and in amplitude/impedance in the coarse-grained sediment digital image 1310 indicate a higher clathrate concentration 1410.

At 340, the method 300 to determine an overlap region from the combined digital image where the pull-up digital image and coarse-grained sediment digital image overlap, wherein the overlap region is indicative of a clathrate deposit. Moreover, one region of overlap may have a higher clathrate concentration when compared to another region of overlap. In some embodiments, multiple overlap regions (regions of overlap) may be determined in the combined digital image. As indicated herein, higher values of both pull-up in the pull-up digital image and reflectivity/impedance in the coarse-grained sediment digital image indicate higher clathrate concentrations. The computing system 200 may automatically determine a region of overlap in the combined digital image by using thresholds indicative of clathrate deposits.

Figure 14B:
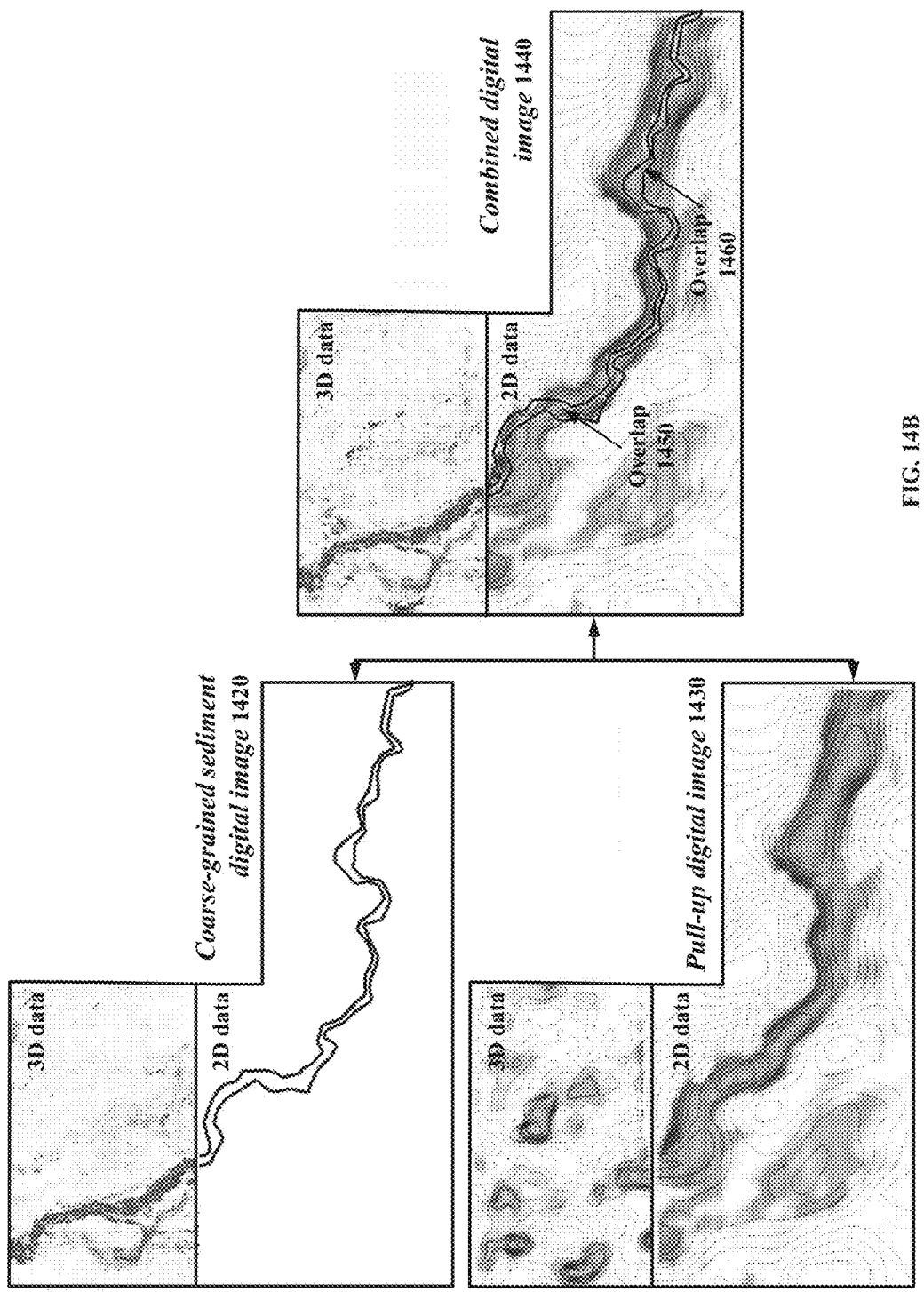
FIG. 14B illustrates a real example of a coarse-grained sediment digital image, a real example of a pull-up digital image, and a real example of a combined digital image with an overlap region.

One real example of a coarse-grained sediment digital image 1420, a pull-up digital image 1430, and a combined digital image 1440 are illustrated in FIG. 14B. In this example, the images are created from both 3D and 2D data, and illustrate the coarse-grained sediment digital image 1420 having a ribbon-like deposit. The deposit creates a pull-up, seen on the pull-up digital image 1430. When the two images are overlapped, the combined digital image 1440 illustrates a clathrate deposit with the highest clathrate concentration found at the overlap regions 1450 and 1460.

Optionally, the method 300 includes converting the laterally extensive subsurface digital image from TWTT to depth as illustrated at 345. For example, the laterally extensive subsurface digital image 1510 of FIG. 15A may be converted from TWTT by the computing system 200 via a velocity model, which will result in removing the seafloor from the laterally extensive subsurface digital image 1520 of FIG. 15B (at 360 of the method 300). The method 300 may also include converting the seismic data 400 (at 350 of the method 300), the laterally extensive subsurface digital image 800 (at 345 of the method 300), the pull-up digital image 1100 (at 355 of the method 300), or any combination thereof, into depth. Similarly, the method 300 may also include removing a land surface or seafloor artifact from the seismic data (at 365 of the method 300), the laterally extensive subsurface digital image (at 370 of the method 300), the pull-up digital image (at 360 of the method 300), or any combination thereof.

Optionally, one example of verifying the identified clathrate deposit (e.g., clathrate-filled sediments or sands) exist in the overlap region (i.e., the identified clathrate deposit) is by using data from a wellbore. A hypothetical wellbore A 1610 and a wellbore B 1620 are illustrated in FIG. 16A to facilitate the discussion both background sound-wave speed 1630 and clathrate sound-wave speed 1640. If a hypothetical wellbore A 1610 is drilled through non-clathrate sediment and a hypothetical wellbore B 1620 is drilled through clathrate sediments, as illustrated in FIG. 16A, the background sound-wave speed 1630 through the non-clathrate sediments increases in a linear fashion as illustrated in FIG. 16B. Yet, the clathrate sound-wave speed 1640 increases in a nonlinear manner as illustrated in FIG. 16C.

Figure 17A:
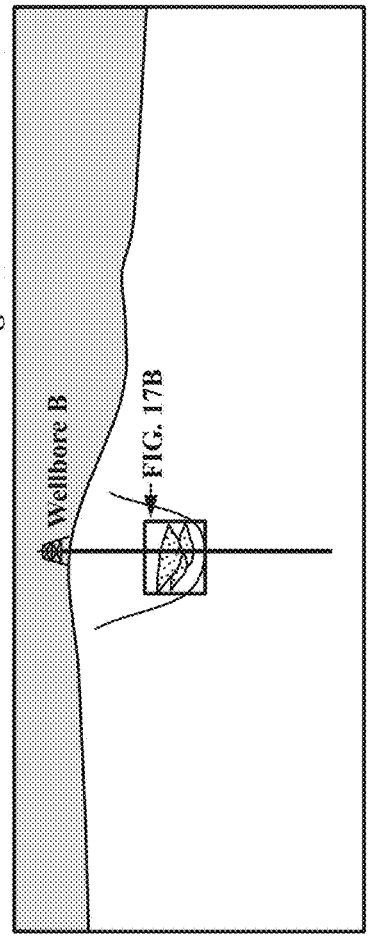
FIG. 17A illustrates a location of clathrate-filled sediments (e.g., sands).
Figure 17B:
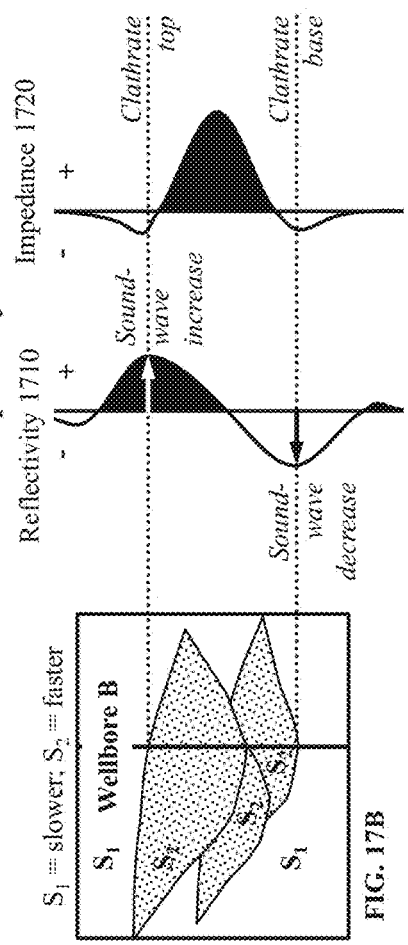
FIG. 17B illustrates a seismic response of the clathrate-filled sediments of FIG. 17A, namely, an increase amplitude and impedance.

One example of the response of clathrate-filled sands is shown in FIG. 17A and FIG. 17B, where the seismic response of the clathrate-filled sands 120 is associated with wellbore B 1620 and an increase in reflectivity 1710 and an increase in impedance 1720. Thus, an increase in reflectivity 1710 and an increase in impedance 1720 indicates clathrate—filled sands 120 and can be used to generate a coarse-grained sediment digital image 1310, such as example coarse-grained sediment digital image 1420 in FIG. 14B. The digital image 1420 is illustrated in map view, but it is not limited to map view. Also, the coarse-grained sediment digital image 1420 does not need to include any wellbores.

Turning to FIG. 18, this figure illustrates one embodiment of a method of producing hydrocarbons, referred to as a method 1800. At 1805, the method 1800 includes obtaining post stack seismic data. For example, a user may obtain the post stack seismic data from a vendor or otherwise cause the seismic data to be obtained. The post stack seismic data may be sent, for example, to the computing system 200 as the seismic data 224.

At 1810, the method 1800 includes obtaining an overlap region from a combined digital image, where the overlap region is indicative of a clathrate deposit, and where the combined digital image is produced by steps including: generating a land surface or seafloor digital image from the post-stack seismic image; determining a clathrate stability zone from the land surface of sea floor digital image; generating a laterally extensive subsurface digital image from the seismic data that is within or below the clathrate stability zone; filtering the laterally extensive subsurface digital image to generate a pull-up digital image; generating a coarse-grained sediment digital image from the seismic data within the clathrate stability zone; spatially superimposing the coarse-grained sediment digital image and the pull-up digital image to generate a combined digital image; and determining the overlap region from the combined digital image where the pull-up digital image and the coarse-grained sediment digital image overlap. For example, these items are discussed hereinabove.

At 1815, the method 1800 includes making a decision regarding a wellbore location based on the identified clathrate deposit, drilling a wellbore at the wellbore location, and producing the hydrocarbons via the wellbore. Making the decision regarding the wellbore location based on the identified clathrate deposit may include the latitude, longitude, depth, etc. of the wellbore, for example, based on the configuration of the wellbore (e.g., U-shaped, vertical, deviated, etc.). In some embodiments, decisions regarding a plurality of wellbores locations may be made and a plurality of wellbores may be drilled at the plurality of wellbore locations.

In some embodiments, the decision regarding the wellbore location may be based on producing the hydrocarbons from the identified clathrate deposit. If the desired outcome is to produce hydrocarbons from the identified clathrate deposit, then the user may decide on the location of at least one wellbore in order to produce the hydrocarbons from the identified clathrate deposit. Those of ordinary skill in the art will appreciate that practically any technique for producing hydrocarbons from a clathrate deposit may be used.

In some embodiments, the decision regarding the wellbore location may be based on producing the hydrocarbons from the identified clathrate deposit and another deposit. In some embodiments, the desired outcome may include producing hydrocarbons from both the identified clathrate deposit and the other deposit. The identified clathrate deposit may be at a shallower depth than the other deposit (e.g., hydrocarbon deposit having oil), in other words, the other deposit may be deeper than the identified clathrate deposit. Hydrocarbons may be produced from both the identified clathrate deposit and the other deposit as discussed in the following patent application assigned to Chevron U.S.A. Inc.: US Patent App. No. 2015/0090455, which is incorporated herein by reference in its entirety and for all purposes.

As described in US Patent App. No. 2015/0090455, a first hydrocarbon wellbore may be drilled and operated to extract hydrocarbons from a hydrocarbon reservoir. The temperature of the hydrocarbons in the hydrocarbon reservoir may be naturally greater than the temperature of a clathrate deposit in the form of a natural gas hydrate reservoir. A pump operates to draw the hydrocarbons from the hydrocarbon reservoir and through the hydrocarbon wellbore. The hydrocarbon wellbore is connected to another well, such as through a conduit, and the extracted hydrocarbon is then supplied through the conduit into the other wellbore. While flowing through the other well, heat is transferred from the hydrocarbons into the natural gas hydrate reservoir, forming a heated portion. The hydrocarbons exit in the other well. After the heating, the other wellbore may be disconnected from the hydrocarbon well by removing the conduit. The other wellbore is then perforated with apertures and the apertures permit the natural gas hydrate to be drawn into the other wellbore. Another pump operates to draw the natural gas hydrate water out of the natural gas hydrate reservoir into the other wellbore through the apertures. The natural gas hydrate water exits in the other wellbore. As such, two wellbores may be drilled at two wellbore locations to allow for production of hydrocarbons from both the clathrate deposit (in the form of a natural gas hydrate reservoir in this example) and another deposit (in the form of a hydrocarbon reservoir in this example). Those of ordinary skill in the art will appreciate that practically any technique for producing hydrocarbons from a clathrate deposit and the other deposit may be used.

In some embodiments, the decision regarding the wellbore location may be based on producing the hydrocarbons from another deposit, where the other deposit and the identified clathrate deposit are different. If the desired outcome is to produce hydrocarbons from another deposit having hydrocarbons, and avoid the identified clathrate deposit, then the user may decide on the location of at least one wellbore in order to produce the hydrocarbons from the other deposit. A wellbore location(s) for an injection wellbore(s) and a wellbore location(s) for a production wellbore(s) may be decided upon and drilled in order to produce hydrocarbons from the other deposit. To produce the hydrocarbons from the other deposit, those of ordinary skill in the art may use waterflooding, enhanced oil recovery (EOR), any combination thereof, etc. Examples of EOR operations or EOR applications include, for example, miscible gas injection (which includes, for example, carbon dioxide flooding), chemical injection (sometimes referred to as chemical enhanced oil recovery (CEOR), and which includes, for example, polymer flooding, alkaline flooding, surfactant flooding, conformance control operations, as well as combinations thereof (such as alkaline-polymer flooding or alkaline-surfactant-polymer flooding), microbial injection, and thermal recovery (which includes, for example, cyclic steam, steam flooding, and fire flooding). In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, a conformance control operation, or any combination thereof.

Those of ordinary skill in the art will appreciate that practically any technique for producing hydrocarbons from the other deposit may be used.

In addition to making at least one decision regarding a wellbore location, in some embodiments, at least one decision regarding the following may also be made: quantity of wellbores, configuration of the wellbore(s) to be drilled, selection of completion equipment, selection of fluids, etc.

After production of the hydrocarbons begins, with the hydrocarbons as hydrates only, non-hydrate hydrocarbons only, or both hydrates and non-hydrate hydrocarbons, those of ordinary skill in the art will appreciate that various other techniques may be used. For example, four dimensional (4D) may be used after production begins, as well as any other appropriate technique.

In some embodiments, the method 1800 may also include verifying presence of the identified clathrate deposit in cross section, map view, or any combination thereof. Furthermore, the method 1800 may also include verifying presence of the identified clathrate deposit using well data. The method 1800 may also include other modifications.

Clathrate Deposit Quantification Using Seismic Data—

Provided herein are embodiments of a method, a system, and a program product for quantifying a clathrate deposit in a subsurface from seismic data. In one embodiment, the method includes determining a maximum and a minimum value of a pull-up, wherein the pull-up is from a digital image that includes the pull-up; estimating a sound-wave speed of a clathrate deposit causing the pull-up and a sound-wave speed of a background deposit, wherein the clathrate deposit and the background deposit are different; calculating a gross clathrate thickness using the maximum value of the pull-up, the minimum value of the pull-up, the sound-wave speed of the clathrate deposit, and the sound-wave speed of the background deposit; using the sound-wave speed of the clathrate deposit to establish a relationship with clathrate concentration value; and determining a net clathrate thickness using a product of the gross clathrate thickness and the clathrate concentration value.

Advantageously, those of ordinary skill in the art may appreciate that the embodiments provided herein rely on a seismic data-driven approach to quantify the clathrate deposit. The seismic data-driven approach does not require any prior geophysical knowledge of the subsurface, for example, the following are not required: well data, core samples, tomographic information, velocity measurements, velocity models, smoothed velocity models, or anomalous velocity models. The seismic data-driven approach also does not require any geologic knowledge of the subsurface, for example, the following are not required: digital images of subsurface sand and shale deposits, digital images of the configuration and geometry of the subsurface, or knowledge about porosity or permeability trends. Moreover, the seismic data-driven approach makes no assumption of the subsurface and can be utilized in practically any area (e.g., onshore, offshore—shallow water or deep water, etc.), with few to no wellbores or associated well data. If desired, well data, etc. may be used as one methodology to verify a clathrate deposit quantification that is determined with the embodiments herein, but no well data, etc. is necessary. As such, quantitative methods, such as inversions or simulations, are unnecessary to quantify a clathrate deposit, based on the technique provided herein.

Advantageously, those of ordinary skill in the art will appreciate that decisions may be made regarding wellbore location and wellbore quantity based on the quantification of the clathrate deposit. If the desired outcome is to produce the quantified clathrate deposit, those of ordinary skill in the art will appreciate that decisions about where to drill one or more wellbores can be made based on the quantity of the clathrate deposit. If the desired outcome is to produce the quantified clathrate deposit, those of ordinary skill in the art will appreciate that decisions about how many wellbores to drill can be made based on the quantity of the clathrate deposit. For example, a clathrate deposit with a larger quantity of clathrates may lead to the selection of a higher number of wellbore locations and drilling a higher number of wellbores as compared to a clathrate deposit with a smaller quantity of clathrates. If the desired outcome is to avoid the quantified clathrate deposit, those of ordinary skill in the art will appreciate that the quantity of that clathrate deposit can be used to make decisions about where not to drill wellbores or where to drill wellbores so as to avoid the quantity of the clathrate deposit. Furthermore, if the desired outcome is to avoid the clathrate deposit, those of ordinary skill in the art will appreciate that decisions about how many wellbores to drill can be made to avoid the quantity of the clathrate deposit.

Additionally, those of ordinary skill in the art will appreciate that decisions about which completions, components, fluids, etc. to select for the one or more wellbores to be drilled, including the configuration of the one or more wellbores (e.g., vertical, horizontal, etc.), can also be made based on the quantity of the clathrate deposit. For example, casing, tubing, packers, heaters, sand screens, gravel packs, items for fines migration, etc. may be selected based on the quantity of the clathrate deposit. Moreover, methodologies to produce the clathrate deposit may also be selected based on the quantity of the clathrate deposit. Some methodologies and devices that may be used to produce the clathrate deposit, such as a hydrate deposit, are provided in the following patents and patent applications assigned to Chevron U.S.A. Inc.: US Patent App. No. 2015/0090455, U.S. Pat. No. 7,812,203, US Patent App. No. 2008/0102000, U.S. Pat. No. 7,964,150, U.S. Pat. No. 8,201,626, and U.S. Pat. No. 7,537,058, all of which are incorporated herein by reference in their entirety and for all purposes.

Advantageously, those of ordinary skill in the art will appreciate that other decisions may also be made based on the quantity of the clathrate deposit. For example, decisions may be made regarding prioritization of hydrocarbon production drilling projects, resource management, etc. to focus efforts on producing clathrate deposits that have higher quantities of clathrates. In short, those of ordinary skill in the art will appreciate that the options are many and making proper decisions based on the quantity of the clathrate deposit should improve the likelihood of safe and reliable operations.

Furthermore, the quantity of a clathrate deposit (e.g., a clathrate deposit identified by the methodologies described herein) may be used to make decisions about producing hydrocarbons from the clathrate deposit only, from the clathrate deposit and another deposit, or from the other deposit only as discussed hereinabove.

Figure 19:
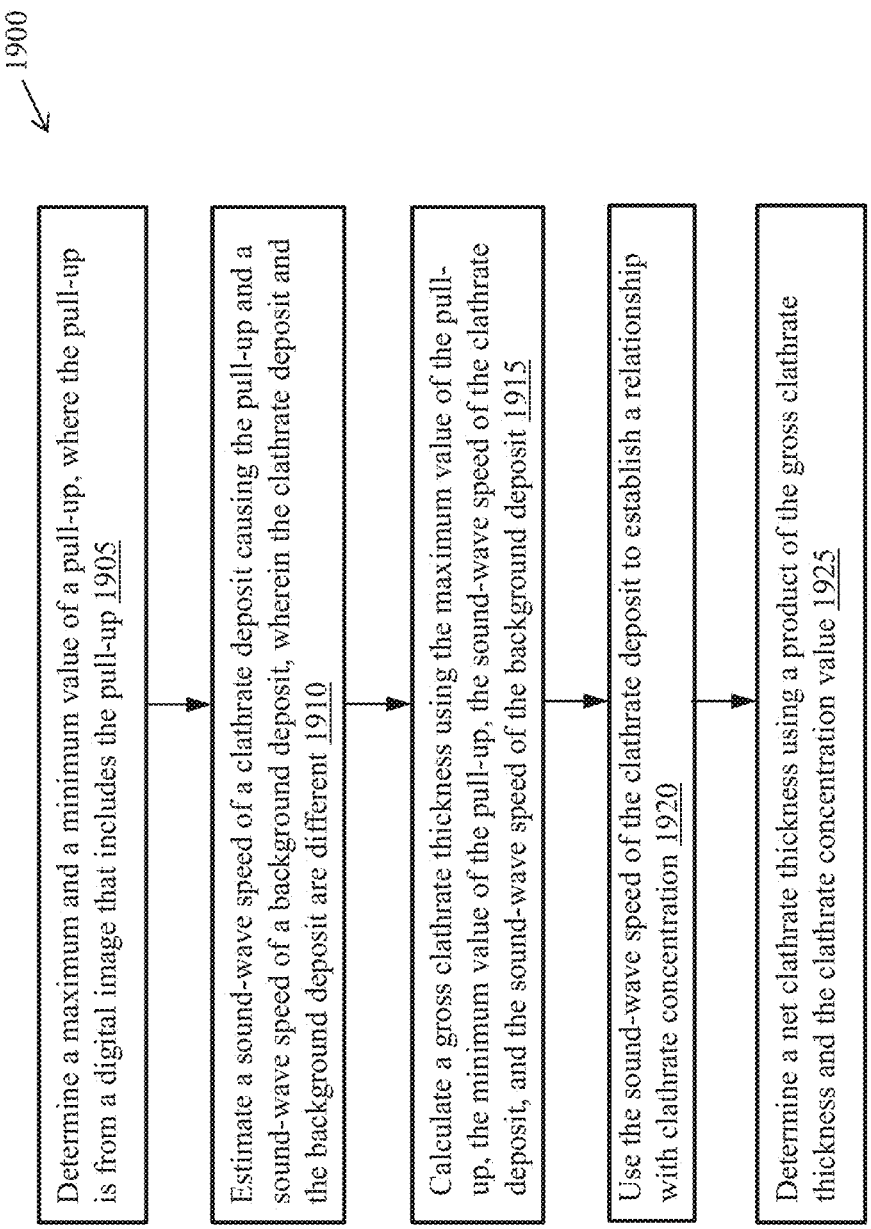
FIG. 19 is a flowchart illustrating one embodiment of a method of quantifying a clathrate deposit in a subsurface from seismic data.

Turning to FIG. 19, this figure illustrates one embodiment of a method of quantifying a clathrate deposit in a subsurface using seismic data, referred to as a method 1900. The method 1900 may be executed by the computing system 200 of FIG. 2. Those of ordinary skill in the art will appreciate that the clathrate deposit (e.g., the clathrate filled sands 120) identified by the method 300 in FIG. 3 may be quantified via the method 1900 without any well data and without any drilled wellbores. Indeed, the method 1900 is seismic data-driven and makes no assumptions. If the desired outcome is to produce the clathrate deposit (e.g., the clathrate filled sands 120), those of ordinary skill in the art will also appreciate that one or more wellbores will have to be drilled in order to truly confirm the quantity of the clathrate deposit (e.g., the clathrate filled sands 120) and produce the clathrate deposit (e.g., the clathrate filled sands 120). However, those of ordinary skill in the art will also appreciate that the method 1900 may be executed independently and without execution of the method 300 of FIG. 3. Thus, a clathrate deposit may be identified and quantified with the techniques provided herein in some embodiments, or a clathrate deposit may be only identified with the techniques provided herein in some embodiments, or a clathrate deposit may be only quantified with the techniques provided herein in some embodiments.

At 1905, the method 1900 includes determining a maximum and a minimum value of a pull-up, wherein the pull-up is from a digital image that includes the pull-up. An example of the digital image that includes the pull-up may be a combined digital image, such as the combined digital image 2010 that is illustrated in FIG. 20A (from FIG. 14A). The FIG. 20A uses an example of a 10 m and 100 m thick pull-up, and is the basis for the running quantification example in FIGS. 20A, 20B, FIG. 21A, and FIG. 21B. Alternatively, the combined digital image from FIG. 14B may be used. Those of ordinary skill in the art will appreciate that practically any combined digital image generated by spatially superimposing a coarse-grained sediment digital image and a pull-up digital image may be used.

Alternatively, the digital image that includes the pull-up may be a pull-up digital image (e.g., the pull-up digital image 1330 of FIG. 13C or FIG. 14B). Those of ordinary skill in the art will appreciate that practically any pull-up digital image that is generated by filtering a laterally extensive subsurface digital image may be used.

In some embodiments, the digital image with the pull-up may be generated with techniques disclosed herein or not generated with the techniques disclosed herein. Furthermore, in some embodiments, the digital image with the pull-up may have been previously determined and it may simply be received at 1905. The computing system 200 may automatically determine a range of values for the pull-up of the combined digital image 2010 of FIG. 20A, including the minimum value of the pull-up and the maximum value of the pull-up. In the running quantification example starting at FIG. 20A, the minimum value is 10 m for the pull-up and the maximum value is 100 m for the pull-up.

At 1910, the method 1900 includes estimating a sound-wave speed of a clathrate deposit causing the pull-up and a sound-wave speed of a background deposit, wherein the clathrate deposit and the background deposit are different. The sound-wave speed may be determined via modeled values of the corresponding deposits, or from measured values if a wellbore has been drilled. For example, for modeled values, the sound-wave speed may be estimated by inferring the concentration relative to the speed of pure clathrates (3.3-3.8 km/s). For example, for direct values, the sound-wave speed could be based on borehole measurements, such as sonic or sound-wave speed. The computing system 200 may estimate the sound-wave speeds, and in some embodiments, a user may confirm the accuracy of the sound-wave speed estimates generated by the computing system 200 before proceeding to the next step. In the running quantification example, as illustrated at FIG. 20B, the sound-wave speed of the clathrate deposit is 2 while the sound-wave speed of the background deposit is 1.

At 1915, the method 1900 includes calculating a gross clathrate thickness using the maximum value of the pull-up, the minimum value of the pull-up, the sound-wave speed of the clathrate deposit, and the sound-wave speed of the background deposit. FIG. 20B illustrates a formula to calculate gross clathrate thickness and is listed as follows: $T_{cg}=Pu/[(S_c/S_b)-1]$, where $T_{cg}$ is the gross clathrate thickness (m or ft); Pu is the pull-up (m or ft); $S_c$ is clathrate sound-wave speed (m/s or ft/s); and $S_b$ is background sound-wave speed (m/s or ft/s). Sound-wave speed is regularly measured in m/s or ft/s, but is not limited to m/s or ft/s. The gross clathrate thickness may be calculated as a range to account for variability. The gross clathrate thickness may be a single value in some embodiments (e.g., if a wellbore was drilled and the sound-wave speed of the clathrate deposit is known with high certainty), or a single average value in some embodiments, or even a range of values in some embodiments. The computing system 200 may automatically generate the gross clathrate thickness using this formula. In the running quantification example, the gross clathrate thickness has a range of about 11 m and about 110 m.

Figures 21A, 21B:
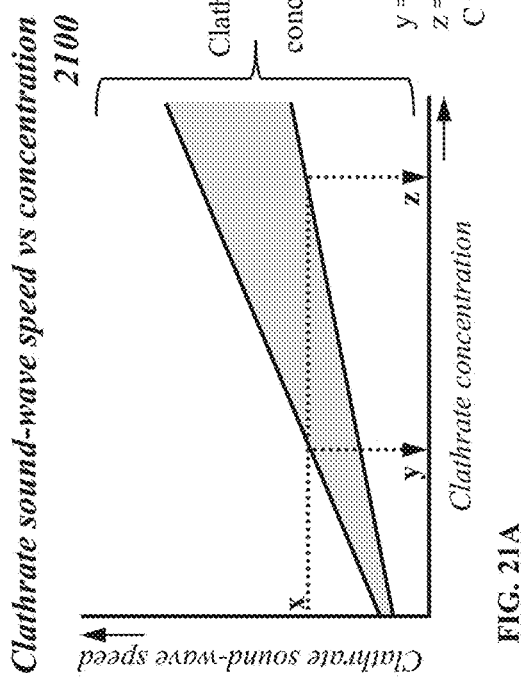
FIG. 21A illustrates an example of using a correlation to establish clathrate saturation from sound-wave speed.
FIG. 21B illustrates an example of using the values of FIG. 21A to determine net clathrate thickness. Thus.

At 1920, the method 1900 includes using the sound-wave speed of the clathrate deposit to establish a relationship with clathrate concentration to generate a clathrate concentration value. FIG. 21A illustrates a linear relationship of clathrate sound-wave speed versus concentration 2100, but the relationship is not limited to a linear relationship. For example, an exponential relationship, a power law relationship, or any other nonlinear relationship may be used in some embodiments. In some embodiments, some assumptions may be made regarding relative clathrate concentration, as one sound wave speed can have two concentrations (e.g., concentrations y and z as illustrated in FIG. 21A). The clathrate concentration value may be a single value in some embodiments, or a single average value between y and z in some embodiments, or even a range of values of y and z in some embodiments. Nonetheless, the clathrate concentration value should be determined for use in calculating the net clathrate thickness. In some embodiments, numbers closer to the z value may be more appropriate due to clathrate growth habitat. The more accurate the sound-wave speed of the clathrate deposit and the knowledge of the growth of clathrates in that habitat (e.g., if a wellbore is drilled), the more accurate the clathrate concentration value. More information may be found in Dai, et al., "Detection and estimation of gas hydrates using rock physics and seismic inversion: Examples from the northern deepwater Gulf of Mexico", The Leading Edge, pp. 60-66 (January 2004), which is incorporated herein by reference in its entirety. In the running quantification example, the clathrate concentration value of y is 0.15 and the clathrate concentration value of z is 0.85. Thus, in this running quantification example, the clathrate concentration value has a range of about 0.15 and about 0.85.

At 1925, the method 1900 includes determining a net clathrate thickness using a product of the gross clathrate thickness and the clathrate concentration value. FIG. 21B illustrates a formula to calculate net clathrate thickness and is listed as follows: $T_{cn}=T_{cg}*C$, where $T_{cn}$ is the net clathrate thickness; $T_{cg}$ is the gross clathrate thickness; and C is the clathrate concentration value. The net clathrate thickness indicates the quantity of clathrates in the clathrate deposit, or at least a more accurate estimate of the quantity of clathrates in the deposit, which can be confirmed by drilling a wellbore and producing the clathrate deposit. The net clathrate thickness may be calculated as a range to account for variability. The net clathrate thickness may be a single value in some embodiments (e.g., if a wellbore was drilled and the sound-wave speed of the clathrate deposit is known with high certainty), or a single average value in some embodiments, or even a range of values in some embodiments. The computing system 200 may automatically generate the net clathrate thickness using this formula. In the running quantification example, the net clathrate thickness has a range of about 1.65 m and about 93.5 m.

Figure 22:
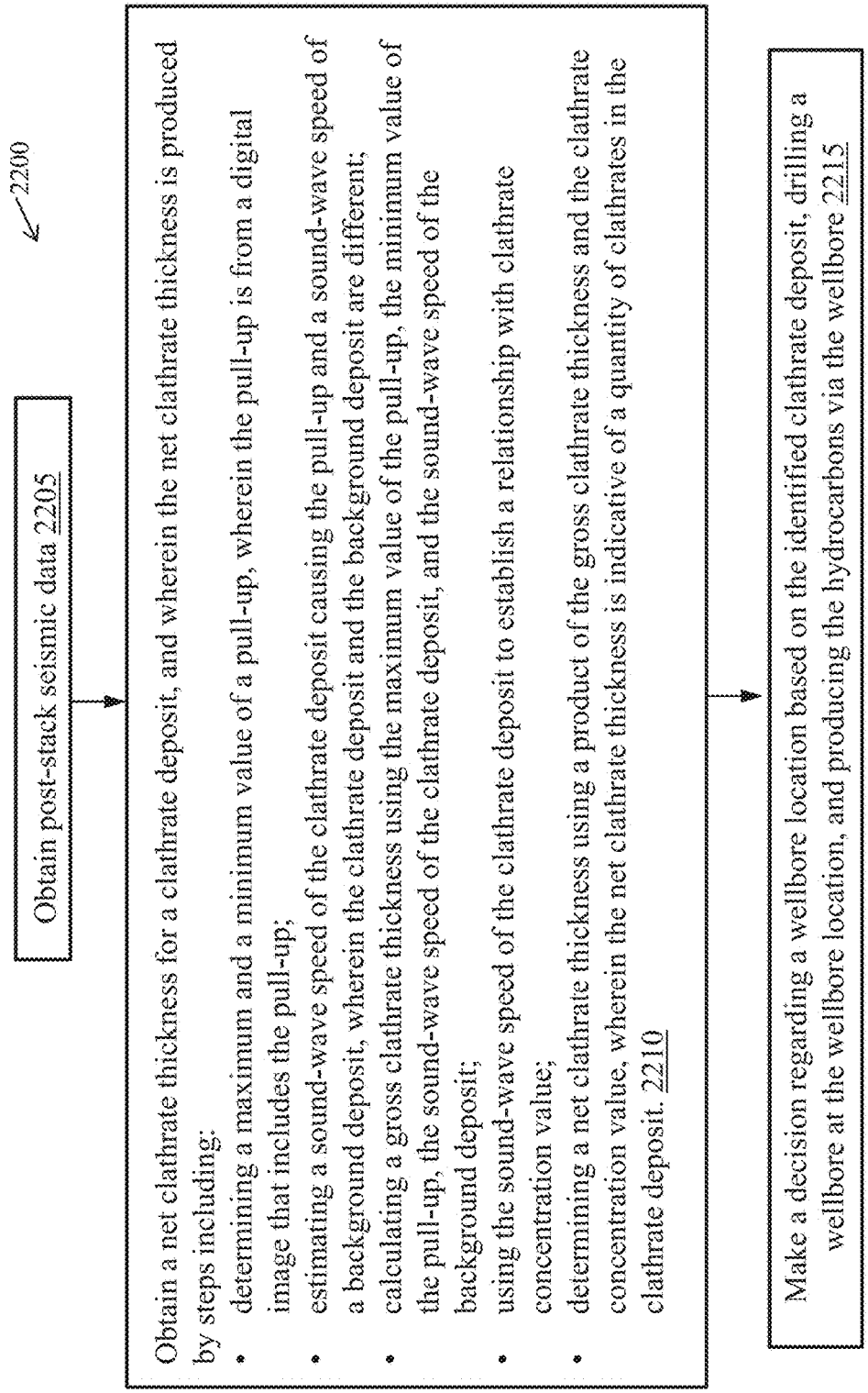
FIG. 22 is a flowchart illustrating one embodiment of a method of producing hydrocarbons.

Turning to FIG. 22, this figure illustrates one embodiment of a method of producing hydrocarbons, referred to as a method 2200. At 2205, the method 2200 includes obtaining post stack seismic data. For example, a user may obtain the post stack seismic data from a vendor or otherwise cause the seismic data to be obtained. The post stack seismic data may be sent, for example, to the computing system 200 as the seismic data 224.

At 2210, the method 2200 includes obtaining a net clathrate thickness for a clathrate deposit, and wherein the net clathrate thickness is produced by steps including: determining a maximum and a minimum value of a pull-up, wherein the pull-up is from a digital image that includes the pull-up; estimating a sound-wave speed of the clathrate deposit causing the pull-up and a sound-wave speed of a background deposit, wherein the clathrate deposit and the background deposit are different; calculating a gross clathrate thickness using the maximum value of the pull-up, the minimum value of the pull-up, the sound-wave speed of the clathrate deposit, and the sound-wave speed of the background deposit; using the sound-wave speed of the clathrate deposit to establish a relationship with clathrate concentration value; and determining a net clathrate thickness using a product of the gross clathrate thickness and the clathrate concentration value. The net clathrate thickness is indicative of a quantity of clathrates in the clathrate deposit. For example, these items are discussed hereinabove. For example, the digital image that includes the pull-up may be based on the seismic data.

At 2215, the method 2200 includes making a decision regarding a wellbore location based on the quantity of the clathrate deposit, drilling a wellbore at the wellbore location, and producing the hydrocarbons via the wellbore. In some embodiments, decisions regarding a plurality of wellbores locations may be made and a plurality of wellbores may be drilled at the plurality of wellbore locations. In some embodiments, the decision regarding the wellbore location is based on producing the hydrocarbons from the quantified clathrate deposit. In some embodiments, the decision regarding the wellbore location is based on producing the hydrocarbons from another deposit (e.g., another hydrocarbon deposit), and wherein the other deposit (e.g., another hydrocarbon deposit) and the quantified clathrate deposit are different. The "other deposit" can be the background deposit or practically any other deposit. In some embodiments, the decision regarding the wellbore location is based on producing the hydrocarbons from both the quantified clathrate deposit and the other deposit (e.g., another hydrocarbon deposit), wherein the other deposit and the quantified clathrate deposit are different. The quantity of the clathrate deposit may be verified, for example, by drilling one or more wellbores, from well data, etc. In addition to wellbore location, many decisions can be made based on the quantity of the clathrate deposit, such as, (a) prioritization decisions so as to pursue deposits with higher quantities earlier that deposits with smaller quantities, (b) decisions about which completions, components, fluids, etc. to select for one or more wellbores to be drilled, including the configuration of the one or more wellbores (e.g., vertical, horizontal, etc.), based on the quantity of the quantified clathrate deposit, etc.

Embodiments of the present disclosure can be implemented as a computer process (method), process (method), a computing system, or as an article of manufacture, such as a computer program product or computer readable media. The term computer readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing system 200, above. Computer storage media does not include a carrier wave or other propagated or modulated data signal. In some embodiments, the computer storage media includes at least some tangible features; in many embodiments, the computer storage media includes entirely non-transitory components.

The description and illustration of one or more embodiments provided in this application are not intended to limit or restrict the scope of the invention as claimed in any way. The embodiments, examples, and details provided in this disclosure are considered sufficient to convey possession and enable others to make and use the best mode of claimed invention. The claimed invention should not be construed as being limited to any embodiment, example, or detail provided in this application. Regardless whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope. For instance, such other examples are intended to be within the scope of the claims if they have structural or methodological elements that do not differ from the literal language of the claims, or if they include equivalent structural or methodological elements with insubstantial differences from the literal languages of the claims, etc. All citations referred herein are expressly incorporated herein by reference. For example, U.S. Non-Provisional patent application Ser. No. 15/218,910 with the title "METHODS AND SYSTEMS FOR IDENTIFYING A CLATHRATE DEPOSIT" and filed on the same date as U.S. Non-Provisional patent application Ser. No. 15/218,920 with the title "METHODS AND SYSTEMS FOR QUANTIFYING A CLATHRATE DEPOSIT" are both incorporated herein by reference in their entirety.

The invention claimed is:

1. A method of identifying a clathrate deposit in a subsurface from seismic data, the method comprising using a computing system in:
generating a land surface or sea floor digital image from post-stack seismic data;
determining a clathrate stability zone from the land surface or sea floor digital image;
generating a laterally extensive subsurface digital image from the seismic data that is within or below the clathrate stability zone;
filtering the laterally extensive subsurface digital image to generate a pull-up digital image;
generating a coarse-grained sediment digital image from the seismic data within the clathrate stability zone;
spatially superimposing the coarse-grained sediment digital image and the pull-up digital image to generate a combined digital image; and
determining an overlap region from the combined digital image where the pull-up digital image and the coarse-grained sediment digital image overlap, wherein the overlap region is indicative of a clathrate deposit.

2. The method of claim 1, further comprising converting into depth the post-stack seismic data, the laterally extensive subsurface digital image, the pull-up digital image, or any combination thereof.

3. The method of claim 1, wherein generating the pull-up digital image includes removing a land surface or seafloor artifact from the seismic data, the laterally extensive subsurface digital image, the pull-up digital image, or any combination thereof.

4. The method of claim 1, wherein generating the coarse-grained sediment digital image comprises using amplitude, impedance, seismic attribute, or any combination thereof.

5. The method of claim 1, wherein filtering the laterally extensive subsurface digital image to generate the pull-up digital image comprises using a filter, wherein the filter comprises a spatial filter, a temporal filter, or any combination thereof.

6. The method of claim 5, wherein the filter comprises a Gaussian Regional/Residual Filter, a Lowpass Filter, a Highpass Filter, a Bandpass Filter, a Directional Cosine Filter, or any combination thereof.

7. The method of claim 1, wherein presence of the clathrate deposit is verified in cross section, map view, or any combination thereof.

8. The method of claim 1, wherein presence of the clathrate deposit is verified using well data.

9. A system of identifying a clathrate deposit in a subsurface from seismic data, the system comprising:
a processor; and
a memory communicatively connected to the processor, the memory storing computer-executable instructions which, when executed, cause the processor to perform:
generating a land surface or sea floor digital image from post-stack seismic data;
determining a clathrate stability zone from the land surface or sea floor digital image;
generating a laterally extensive subsurface digital image from the seismic data that is within or below the clathrate stability zone;
filtering the laterally extensive subsurface digital image to generate a pull-up digital image;
generating a coarse-grained sediment digital image from the seismic data within the clathrate stability zone;
spatially superimposing the coarse-grained sediment digital image and the pull-up digital image to generate a combined digital image; and
determining an overlap region from the combined digital image where the pull-up digital image and the coarse-grained sediment digital image overlap, wherein the overlap region is indicative of a clathrate deposit.

10. The system of claim 9, wherein the computer-executable instructions, when executed, cause the processor to further perform converting into depth the seismic data, the laterally extensive subsurface digital image, the pull-up digital image, or any combination thereof.

11. The system of claim 9, wherein generating the pull-up digital image includes removing a land surface or seafloor artifact from the seismic data, the laterally extensive subsurface digital image, the pull-up digital image, or any combination thereof.

12. The system of claim 9, wherein generating the coarse-grained sediment digital image comprises using amplitude, impedance, seismic attribute, reflectivity, or any combination thereof.

13. The system of claim 9, wherein filtering the laterally extensive subsurface digital image to generate the pull-up digital image comprises using a filter, wherein the filter comprises a spatial filter, a temporal filter, or any combination thereof.

14. The system of claim 13, wherein the filter comprises a Gaussian Regional/Residual Filter, a Lowpass Filter, a Highpass Filter, a Bandpass Filter, a Directional Cosine Filter, or any combination thereof.

15. The system of claim 9, wherein the presence of the clathrate deposit is verified in cross section, map view, or any combination thereof.

16. The system of claim 9, wherein presence of the clathrate deposit is verified using well data.

17. A computer-readable medium having computer-executable instructions stored thereon which, when executed by a computing system, cause the computing system to perform a method of identifying a clathrate deposit in a subsurface from seismic data, the method comprising:
   generating a land surface or sea floor digital image from post-stack seismic data;
   determining a clathrate stability zone from the land surface or sea floor digital image;
   generating a laterally extensive subsurface digital image from the seismic data that is within or below the clathrate stability zone;
   filtering the laterally extensive subsurface digital image to generate a pull-up digital image;
   generating a coarse-grained sediment digital image from the seismic data within the clathrate stability zone;
   spatially superimposing the coarse-grained sediment digital image and the pull-up digital image to generate a combined digital image; and
   determining an overlap region from the combined digital image where the pull-up digital image and the coarse-grained sediment digital image overlap, wherein the overlap region is indicative of a clathrate deposit.

18. A method of producing hydrocarbons, the method comprising:
   obtaining post-stack seismic data;
   obtaining an overlap region from a combined digital image, where the overlap region is indicative of a clathrate deposit, and where the combined digital image is produced by steps comprising:
      generating a land surface or seafloor digital image from the post-stack seismic image;
      determining a clathrate stability zone from the land surface of sea floor digital image;
      generating a laterally extensive subsurface digital image from the seismic data that is within or below the clathrate stability zone;
      filtering the laterally extensive subsurface digital image to generate a pull-up digital image;
      generating a coarse-grained sediment digital image from the seismic data within the clathrate stability zone;
      spatially superimposing the coarse-grained sediment digital image and the pull-up digital image to generate a combined digital image; and
      determining the overlap region from the combined digital image where the pull-up digital image and the coarse-grained sediment digital image overlap; and
   making a decision regarding a wellbore location based on the identified clathrate deposit, drilling a wellbore at the wellbore location, and producing the hydrocarbons via the wellbore.

19. The method of claim 18, wherein the decision regarding the wellbore location is based on producing the hydrocarbons from the identified clathrate deposit.

20. The method of claim 18, wherein the decision regarding the wellbore location is based on producing the hydrocarbons from another deposit, and wherein the other deposit and the identified clathrate deposit are different.

21. The method of claim 18, wherein the decision regarding the wellbore location is based on producing the hydrocarbons from both the identified clathrate deposit and the other deposit, wherein the other deposit and the identified clathrate deposit are different.

22. The method of claim 18, further comprising verifying presence of the identified clathrate deposit in cross section, map view, or any combination thereof.

23. The method of claim 18, further comprising verifying presence of the identified clathrate deposit using well data.

* * * * *